(12) United States Patent
Ferrario

(10) Patent No.: US 8,493,036 B2
(45) Date of Patent: Jul. 23, 2013

(54) CONTROLLABLE CHARGE PATHS, AND RELATED METHODS

(75) Inventor: Bruno Ferrario, Cupertino, CA (US)

(73) Assignee: Advanced Analogic Technologies, Inc., Santa Clara, CA (US)

( * ) Notice: Subject to any disclaimer, the term of this patent is extended or adjusted under 35 U.S.C. 154(b) by 919 days.

(21) Appl. No.: 11/559,550

(22) Filed: Nov. 14, 2006

(65) Prior Publication Data

US 2008/0094042 A1    Apr. 24, 2008

Related U.S. Application Data

(60) Provisional application No. 60/853,289, filed on Oct. 21, 2006.

(51) Int. Cl.
*H02J 7/00*        (2006.01)

(52) U.S. Cl.
USPC .......................................................... 320/166

(58) Field of Classification Search
USPC .................... 320/166, 167; 323/901; 307/109
See application file for complete search history.

(56) References Cited

U.S. PATENT DOCUMENTS

| | | | | |
|---|---|---|---|---|
| 4,081,793 | A * | 3/1978 | Lohstroh | 340/14.62 |
| 5,610,807 | A | 3/1997 | Kanda et al. | |
| 5,889,751 | A * | 3/1999 | Tsujioka et al. | 369/116 |
| 6,463,546 | B1 * | 10/2002 | Jeske et al. | 713/400 |
| 6,563,269 | B2 | 5/2003 | Robinett et al. | |
| 7,573,238 | B2 * | 8/2009 | Kawai | 320/132 |
| 7,633,284 | B2 * | 12/2009 | Ingram et al. | 324/76.11 |
| 2001/0043113 | A1 | 11/2001 | Hoshino et al. | |
| 2002/0067143 | A1 * | 6/2002 | Robinett et al. | 315/291 |
| 2005/0099164 | A1 * | 5/2005 | Yang | 323/266 |
| 2005/0162543 | A1 * | 7/2005 | Kobayashi | 348/371 |
| 2005/0231171 | A1 * | 10/2005 | Kato et al. | 320/166 |
| 2005/0237039 | A1 * | 10/2005 | Kikuchi et al. | 323/282 |
| 2006/0044054 | A1 * | 3/2006 | Yamazaki et al. | 327/540 |
| 2008/0136373 | A1 * | 6/2008 | Lai et al. | 320/128 |
| 2008/0252266 | A1 * | 10/2008 | Bolz et al. | 320/166 |

FOREIGN PATENT DOCUMENTS

| | | |
|---|---|---|
| JP | 6202208 A | 7/1994 |
| JP | 2004080942 A | 3/2004 |

OTHER PUBLICATIONS

PCT International Search Report and Written Opinion dated Jun. 17, 2008, for International Application No. PCT/US2007/081561.
CAP-XX Pty Limited 2005, "CAP-XX Application Note No. 1004, Driving High-Power White LED Flash in Camera Phones," May 31, 2005, 15 pages.
Luxresearch, "Intellectual Property & Technology Overview", www.luxresearchinc.com, Oct. 17, 2004, 3 pages.

(Continued)

*Primary Examiner* — Arun Williams
(74) *Attorney, Agent, or Firm* — Sheppard, Mullin, Richter & Hampton LLP

(57) ABSTRACT

Mobile devices have limited power sources. In some cases, such as camera flash operations in cell phones or digital cameras, the power required to provide bright illumination is significant and exceeding the battery voltage level. In order to supply burst power or continuous high power to light sources, such as white LEDs (light emitting diodes), mobile devices typically employ charge storage functioning as energy reservoir that can supply the required power. One such charge storage is a supercapacitor that can supply the needed power repeatedly by discharging and recharging. Various embodiments of the present invention include devices and methods for providing the charge energy and controlling the charge and discharge operations.

49 Claims, 23 Drawing Sheets

OTHER PUBLICATIONS

Portable Design, "Tri-mode current-output charge pump suits white LED camera flash apps," Oct. 3, 2005, Sunnyvale, California, 2 pages.
Portable Design, "700-mA charge pump provides protection for cell phone camera flash apps," Mar. 21, 2006, Camarillo, California, 2 pages.
Advanced Analogic, "AnalogicTech Debuts Six-Channel Backlight Charge P Capability," Oct. 17, 2005, 2 pages.
Dallas Semiconductor MAXIM, "Application Note 3070, Standard and White LED Basics and Operation," Feb. 25, 2004, 6 pages.
Dallas Semiconductor MAXIM, "Application Note 3256, Why Drive White LEDs with Constant Current?," http://www.maxim-ic.com/an3070, Jun. 3, 2004, 13 pages.
Supplementary Search Report mailed Jan. 30, 2012 from European Patent Application No. 07871171.0 filed Oct. 16, 2007.

* cited by examiner

* Gate Control Bias

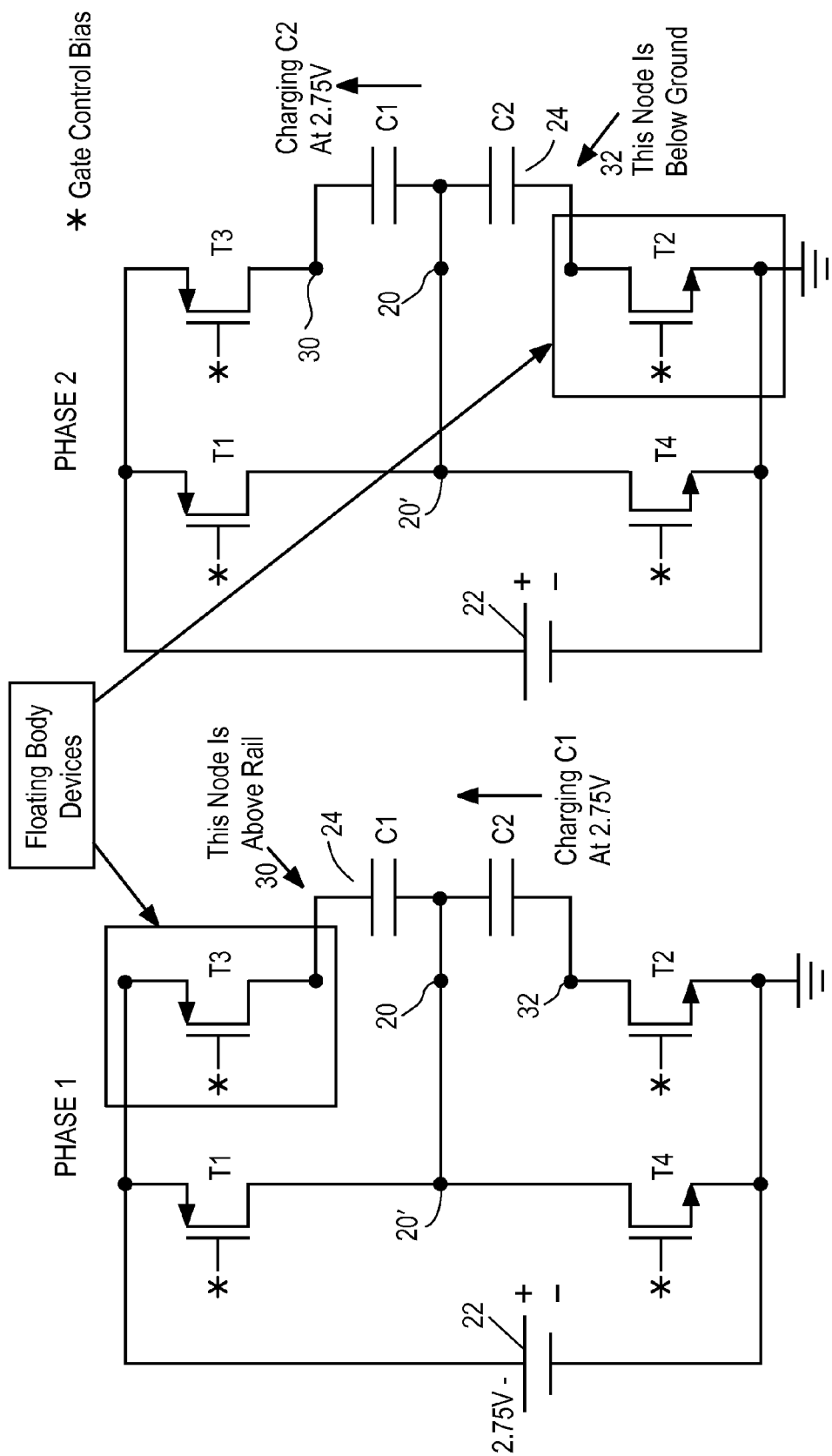
FIG. 5D(2)
FIG. 5D(1)

E/A Adjusts The Current Level To Keep Each Cap Charged To REF

CONTROLLABLE CHARGE PATHS, AND RELATED METHODS

REFERENCE TO EARLIER APPLICATION

This application claims the benefit of and incorporates by reference U.S. Provisional Application, Ser. No. 60/853,289, filed Oct. 21, 2006, titled "Charging Scheme."

FIELD OF THE INVENTION

The present invention relates generally to power management in mobile devices and more specifically to energy storage with a particular application in mobile devices where charge drivers are used for producing short pulses to power flash LEDs.

BACKGROUND

White LEDs have been a popular choice for use in backlighting, torch and camera flash applications, and manufacturers of consumer electronic device have embraced charge drivers to power white LEDs in mobile systems that run on batteries such as lithium-ion or polymer batteries. In such applications, white light illumination needs to be bright and with increases in the resolution of images, which now exceed mega pixels per image, white light illumination needs to be even brighter. Thus, in most applications, several white LEDs are combined to operate together in order to create brighter illumination. However, the intensity of white LEDs may vary and their color may not be homogeneously white when combined. This is because the forward current characteristics of white LEDs are not exactly similar in all of them.

During flash operations, for instance, white LEDs may require at least 2 A flash current to create sufficiently bright illumination and a current drain from the battery that is limited to nearly 1 A. Lithium-ion or polymer batteries produce a limited current peak of about 1.5-2 A during flash operations and such currents discharges the batteries fast. The current grows proportionally with increases in the voltage and for white LEDs there is therefore a need for higher voltage. However, as current is drawn from the batteries their internal resistance increases and with it their voltage drops. To operate, white LEDs may require a voltage above the 3.0V level to maintain sufficient light intensity and substantially avoid remaining dark. A fully charged lithium-ion or polymer battery provides a typical output of 4.2V, which quickly drops to a 3.0V level as the battery discharges. If white LEDs are operated directly from the battery and the voltage drops, the light intensities decrease and the differences in color become stronger. Therefore, more accurate current control and a minimum level of operating voltage are typically required.

Boost converters and energy storage devices have been developed to support such current requirement by providing a source of instant high energy. For example, boost converters can increase the voltage and reduce the number of cells where it is otherwise impractical to stack batteries. Generally, a boost converter is a voltage step-up converter that is often regarded as a switching mode power supply. A common boost converter circuit includes two or more switches (such as transistor and diode) and a battery and one or more filters made of inductor and capacitor combinations. FIG. 1A illustrates an exemplary boost converter circuit. Thus, although boost converters may be efficient, these circuits are typically external to the flash current source and include bulky components, such as coils, that increase the overall cost and size of the circuit board. Additionally, boost converters (or switching regulators or charge pumps) are not based on charge storage and, depending on the voltage ratio between the forward voltage (VF) of the white LEDs and the voltage supplied from an associated battery, they may require such battery to supply twice the flash current. FIG. 1B is a graph representation of boost converter behavior, including a graph of the flash current and boost converter output voltage. As shown, the current overshoots in a flash state and declines once the flash state ends, requiring supply in excess of 3 A during the flash state.

Unlike the boost converters, energy storage devices are based on charge storage and they are used as a power source for the white LEDs instead of the battery (the battery is, in turn, used as the power source for the charge storage). The charge can be stored by draining current from the battery over time. A type of high-energy storage device that is based on charge storage with high-power discharge is known as the "supercapacitor." Supercapacitors are charge storage devices configured with two capacitor components in series and operating as an energy reservoir capable of providing burst power needed in high power applications such as flash and torch lighting. Supercapacitors are designed to be charged and recharged, repeatedly and to provide instantaneous high discharge currents with rapid recharge between discharge operations.

FIG. 2 illustrates a charge circuit with a supercapacitor used in a flash application. Another circuit may include a combination of the supercapacitor and boost converter, as shown in FIG. 3. One such supercapacitor, provided by CAP-XX, Inc. of Sydney, Australia, exhibits high capacitance of 10 mF to 2.8 F and yields high energy density. Accordingly, a supercapacitor is used in this circuit to store the amount of charge needed for providing a flash energy pulse (i.e., the burst power needed by the white LEDs). The charge can be stored in the supercapacitor by draining the current from the battery over time, and if the current is too low the charge time will be long and perhaps longer than is reasonable for rapid succession of flash operations. Indeed, it take high current to rapidly re/charge the supercapacitor, and with battery power depleted after one or more flash operations the available charge current can be rather small and result in relatively long charge time.

As can be seen, in both FIGS. 2 and 3, the supercapacitor includes two capacitors in series with a center tap between them. Inherently, this design causes charge imbalance and for this reason there is a pair of charge balancing resistors to equalize the voltage across both capacitors and, in turn, create a charge balance. The supercapacitor also suffers from apparent leakage that, in time, causes charge drain.

SUMMARY

The present invention is based, in part, on the foregoing observations and in accordance with its purpose various embodiments of the invention include devices and methods for providing the charge energy and for controlling the charge and discharge operations. Generally, the various implementations of a charge circuit can use a supercapacitor but they may compensate in other ways for its inherent problems. Others can use a pair of capacitors in a configuration suitable to allow the charge-discharge cycles for flash or other operations. As a possible alternative to the aforementioned bulky, costly and complex designs, these implementations use an integrated circuit or a number of discrete components that are typically small, less expensive and efficient in controlling the charge-discharge operations.

According to one embodiment, a device for providing charge energy may include: a battery with positive and negative leads; charge storage with first and second capacitor components in series and a center tap between them; and first and second charge paths between the positive lead and the negative lead. The first charge path traverses via the first capacitor component and the center tap, and the second charge path traverses via the second capacitor component and the center tap. In this embodiment, the charge storage is connected to the plus and minus leads indirectly via the first and second charge paths, respectively, in order to isolate the charge storage therefrom. The charge storage may be configured as a supercapacitor or with two capacitors in series. Additionally, the first and second charge paths can be adapted to switch between open and closed states so that, at any given time, one of them is closed and allowing charge current to pass from the battery to one of the first or second capacitor components. At some time during charge operations, both charging paths might be switched open, for instance, to avoid cross conduction or overheating, or when charging is complete. Then again, if there is an imbalance in the current flowing in the two paths, both charging paths might be simultaneously closed with one of the path actually discharging the corresponding capacitor component with a low current, so that the charging is more than the discharging. In other words, the first and second charge paths are controllable in order to switch "on," switch "off," or adjust any charge current flowing therethrough from the power source (e.g., battery) to one or simultaneously to both of the first and second capacitor components.

In the foregoing device, each of the first and second charge paths may include a pair of switches in series with the first and second capacitor components, respectively, one switch being disposed before (upstream) and one switch being disposed after (downstream) the respective one of the first and second capacitor components. Each of the first and second charge paths may also include a resistor in series with the switches. In one instance, the resistor is attached to the center tap and is shared by the first and second charge paths. In another instance, each of the first and second charge paths has its own resistor. Moreover, the switches can be all transistors, or two of the switches may be transistors and two of the switches may be diodes. The transistors are typically bipolar, FET (field effect transistor) JFET (junction FET), or MOSFET (metal oxide FET), wherein two of the transistors are NPN or N-channel and the other two are PNP or P-channel. In other instances each of the first and second charge paths further includes a current source in series with the switches, or the current source may be common to both of them in series with the switches. In yet another instance, the first and second charge paths may include a voltage regulator common to both of them in series with the switches. The foregoing device, however configured, may be embodied in an IC (integrated circuit) or as a functional block in an IC, wherein such IC can be adapted for use in a mobile device, such as a flash camera and/or a movie camera.

According to another embodiment, a device for providing charge energy to a load may include the load, such as light source; a current sink or other current control device in series with the light source; a battery with positive and negative leads; charge storage with first and second capacitor components in series and a center tap between them, wherein the light source and current sink are operatively coupled across the charge storage to receive from it charge energy; and first and second charge paths traversing from the positive lead to the negative lead. As before, the first charge path traverses via the first capacitor component and the center tap, the second charge path traverses via the second capacitor component and the center tap. Likewise, the charge storage is connected to the plus and minus leads indirectly via the first and second charge paths, respectively, in order to isolate the charge storage therefrom and allow charging the charge storage even as the charge storage is supplying the charge energy to the light source. Moreover, each of the first and second charge paths are adapted to pass charge current from the battery separately to one of the first or second capacitor components. In operation, the charge energy may include burst power, in this embodiment, the current sink is adapted to limit the charge energy received by the load. As mentioned, the load may be a light source comprising one or more a white LEDs (light emitting diodes) adapted for flash, movie or torch lighting operations. This embodiment may be an IC (integrated circuit) or a functional block in an IC, wherein such IC can be adapted for use in a mobile device, such as a flash camera and/or a movie camera.

According to yet another embodiment, a device for controllably providing charge energy includes a battery with positive and negative leads; charge storage with first and second capacitor components in series and a center tap between them; and first and second charge paths between the positive lead and the negative lead, with the first charge path traversing via the first capacitor component and the center tap and the second charge path traversing via the second capacitor component and the center tap. Again, the charge storage is connected to the plus and minus leads indirectly via the first and second charge paths, respectively, in order to isolate the charge storage therefrom.

In this embodiment, the first and second charge paths have each a switch control input adapted to provide open and closed switching control so that at any given time, one of the first and second charge paths is closed and allowing charge current to pass from the battery to one of the first or second capacitor components. As mentioned before, the switching paths can be both closed or both open simultaneously under certain conditions. Specifically, both charging paths could be switched open at some time during operation, e.g., when charging is complete or to avoid overheating; and both charging paths could be simultaneously closed if there is, for instance, an unbalance in the current flowing in them.

In one instance, this device may further include a control loop adapted to assert, one at a time, the switch control input of each the first and second charge paths, wherein the control loop includes a comparator with a reference voltage input and a sense input adapted to receive a sample of the charge sense. In this case, the comparator further includes an output that is activated to control the charge current based on a comparison between the reference voltage and the charge current sample.

Note that the comparison may instead be to the voltage across the capacitor being charged, or to any other quantity that can identify the charge status. In addition, the reference may be other than a voltage depending on what physical entity is being sensed to evaluate the charge status of the supercapacitor (a voltage, a current times a time, etc.). Moreover, the comparator may be replaced by an amplifier (E/A in the drawings stands for error amplifier) that adjusts the charge duty cycle to keep the capacitors charged to the reference voltage. Note also that the control could be exerted on one or both of the charge paths without using switches. For instance, the current source(s) could have a control input to adjust the current in a number of steps or in a continuous way.

The control loop may further include a multiplexer that has a sample current input for each of the first and second charge paths, a switch control input cooperatively coupled to the switch control input of the first or second charge paths, and an output. The multiplexer is adapted, based on the switch control being asserted or negated, to switch between the sample current input for the first and second charge path that supplies a sample current to the charge sense input of the comparator. Note that there could be two control loops with each controlling each charging path. Two control paths ('on' or 'off') could be used in parallel instead of multiplexing the controller. In another instance, the device includes a control circuit that includes a comparator and a wave source responsive to the comparator and adapted to assert, one at a time, the switch control inputs.

In one embodiment, instead of a switch the control input controls the level of current that flows into the capacitor or how much charge is transferred. Furthermore, the control loop may control both charging paths at the same time because the current source could be shared, and there may be two independent control loops to control each charging path. Likewise there may be two independent voltage regulators to charge each capacitor to a different voltage. This voltage may be set without control loop, or it may be controlled by a control loop to adjust the charging voltage of the capacitor to whatever the application requires (for instance, to control the current into the white LED at exactly 200 ma). Accordingly, the control loop may control the output current instead of the charging of the capacitor (any of the control methods that have been considered could do that if we sense the output current instead of the sensing the charge).

Further according to the purpose of the invention, a method for controllably providing charge energy, may include connecting to a power source, such as a battery with positive and negative leads mounted integrally or externally to the device; providing charge storage with first and second capacitor components in series and a center tap between them; and providing first and second charge paths between the positive lead and the negative lead, wherein the first charge path traversing via the first capacitor component and the center tap, and wherein the second charge path traversing via the second capacitor component and the center tap. Such method may further include connecting the charge storage to the plus and minus leads indirectly via the first and second charge paths, respectively, in order to isolate the charge storage therefrom, and providing in each of the first and second charge paths a switch control input adapted to introduce open and closed switching control so that, at any given time, one of the first and second charge paths is closed and allowing charge current to pass from the battery to one of the first or second capacitor components, but not simultaneously to both. Then again, that there could be two control loops with each controlling each charging path. Two control paths ('on' or 'off') could be used in parallel instead of multiplexing the controller.

In one instance, the method further includes charge condition sensing, e.g., one path at a time or both paths substantially simultaneously (two sensing circuits in parallel). The charge condition (e.g., charge current, voltage or time) is determined in each of the first and second charge paths. Based on a reference voltage or other reference value, the method determines whether to switch a state of each of switch control inputs from assert to negate, and vice versa (or whether to provide more/less-current, or longer/shorter-time). The state switching is made when a sample of the charge current or any other charge status indicia in one of the first and second charge paths produces a substantial match with the reference voltage. Note that the control could be other than an opened/closed switch, such as 'more-current'/'less-current' or 'longer-time'/'shorter-time.' In other words, control may involve a state change or a step or a continuous up-down adjustment.

These and other features, aspects and advantages of the present invention, will become better understood from the description herein, appended claims, and accompanying drawings as hereafter described.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

FIGS. 5A-5E are diagrams of various embodiments of charge circuits with transistors and/or diodes standing for the switches.

DETAILED DESCRIPTION

The present invention is based in part on the observation that, in some cases, such as camera flash operations in cell phones or digital cameras, the power required to provide bright illumination is significant and may exceed the battery capacity and voltage level. Thus, in order to supply burst power or continuous high power to white LEDs or other light sources, mobile devices typically employ charge storage functioning as energy reservoir that can supply the required power. However, charge circuits, such as boost converters, can be bulky and expensive and energy storage devices, such as a pair of capacitors in series or the aforementioned supercapacitors, may have some inherent deficiencies that require special compensation. At the same time, charge storage devices, such as the supercapacitor or even the pair of capacitors connected in series, have a center tap that can be advantageously used for the purpose of achieving substantial charge balance and better charge-recharge performance. Specifically, instead of having to redistribute the charge for maintaining charge balance between the capacitor components, the center tap can be used for charging and for periodically refreshing the charge in each capacitor component, one capacitor component at a time or simultaneously both (each through a separate path), using the same voltage available directly from the battery. A further observation was made that a charge circuit may be implemented without either or both of the charge pump and the boost converter.

Consequently, possible implementations of a charge circuit according to the present invention include the charge storage and a control circuit for managing the charge-recharge operations. The control circuit may comprise one or more of solid-state switches, a voltage regulator, current sources and a control loop circuit, in various combinations, for controlling the charge-recharge of the supercapacitor or pair of capacitors. Such control circuit can be implemented using discrete components or, preferably, in a single IC (integrated circuit) or as a functional building block in a complex IC. Moreover, the control circuit may be Implemented without the external components that are typically associated with the boost converter or charge pump to thereby save space and reduce cost.

In these implementations, the supercapacitor is often preferred over the pair of capacitors because it may exhibit better energy density and geometric characteristics relative to the pair of capacitors and it may be a more suitable energy reservoir for providing burst power to light sources such as the white LEDs. So, although the supercapacitor and pair of capacitors may be used interchangeably for the charge storage, because of this preference, as well as for convenience and simplicity, in the following description of various embodiments we refer most often to the supercapacitors.

Figure 1A:
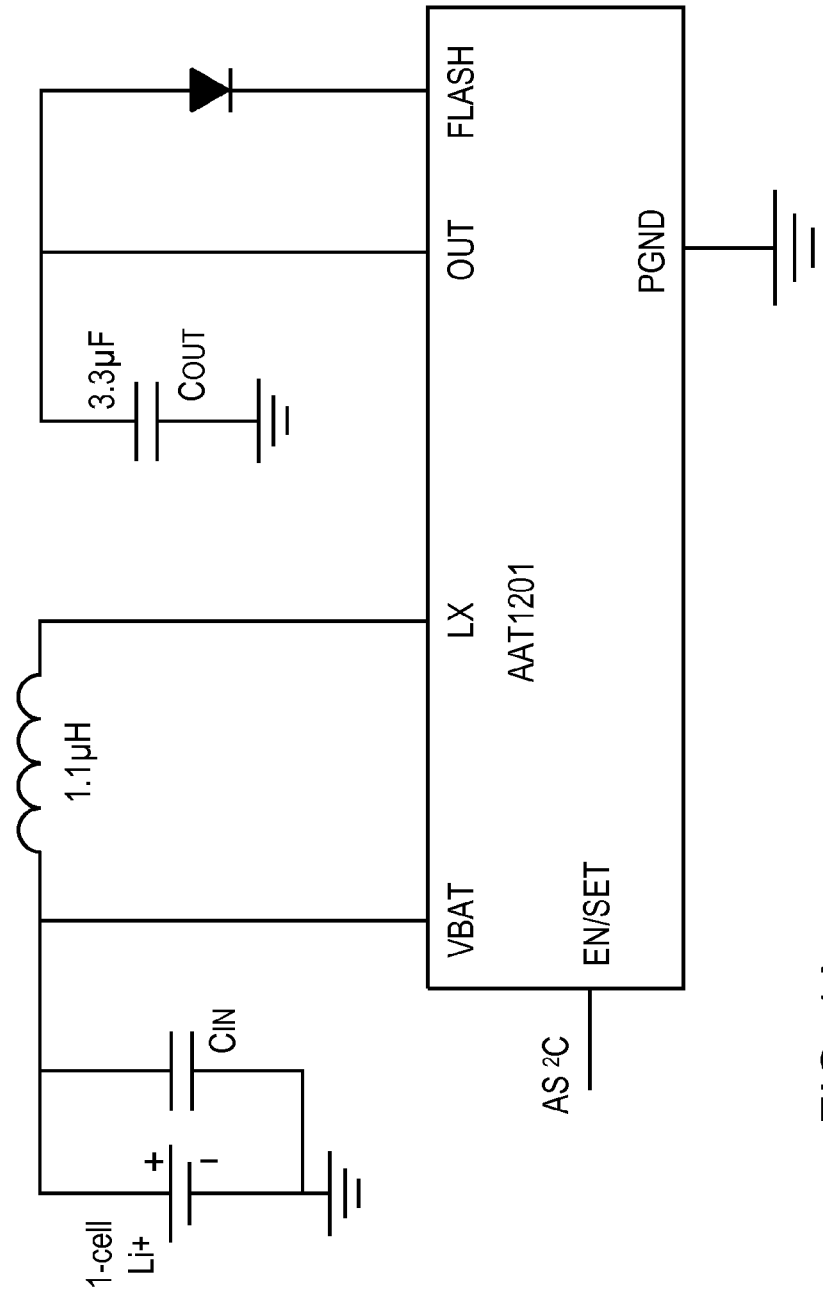
FIG. 1A is a conventional circuit with a boost converter.
Figure 1B:
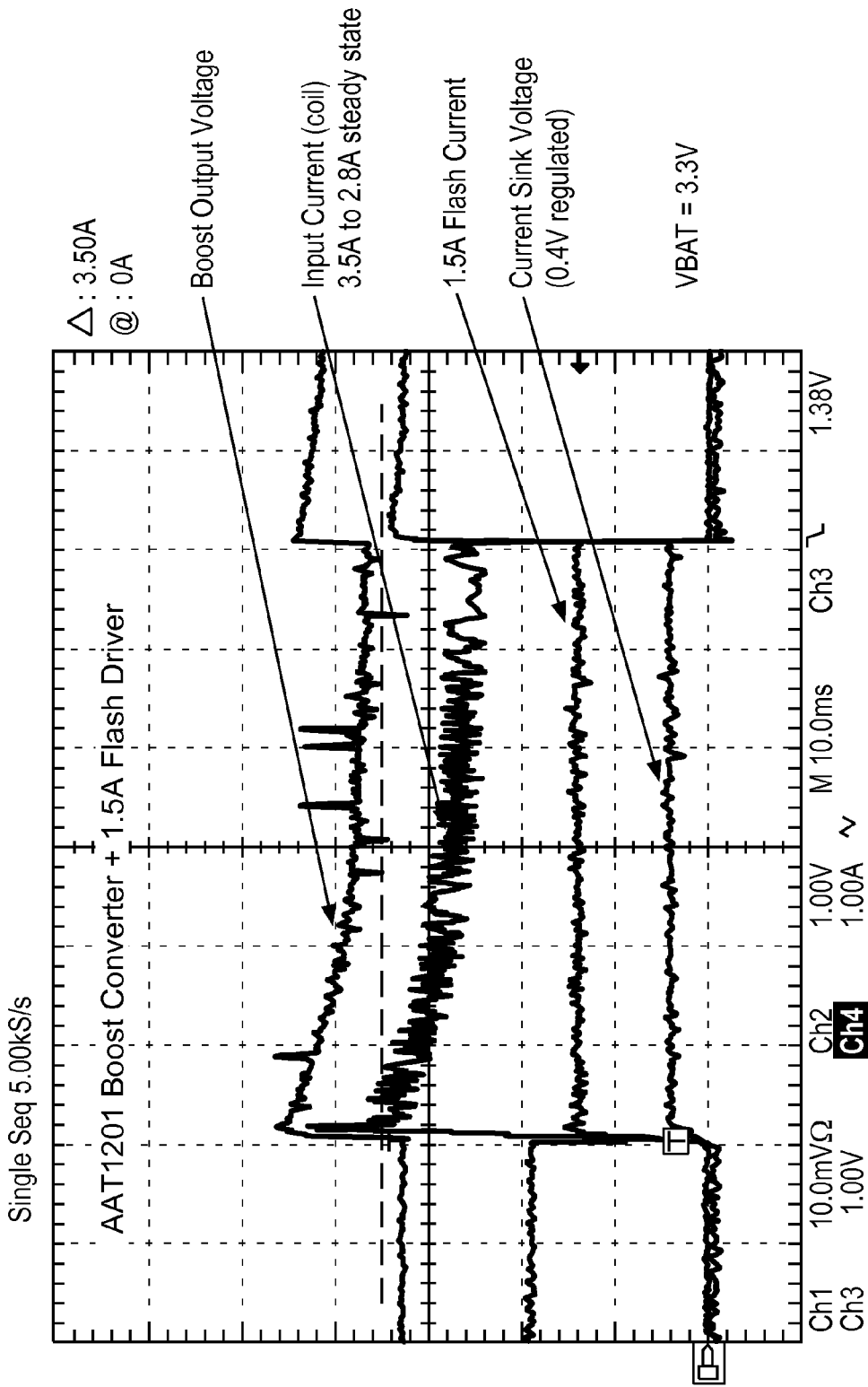
FIG. 1B is a graph representation of boost converter behavior, including a graph of the flash current and boost converter output voltage.
Figure 2:
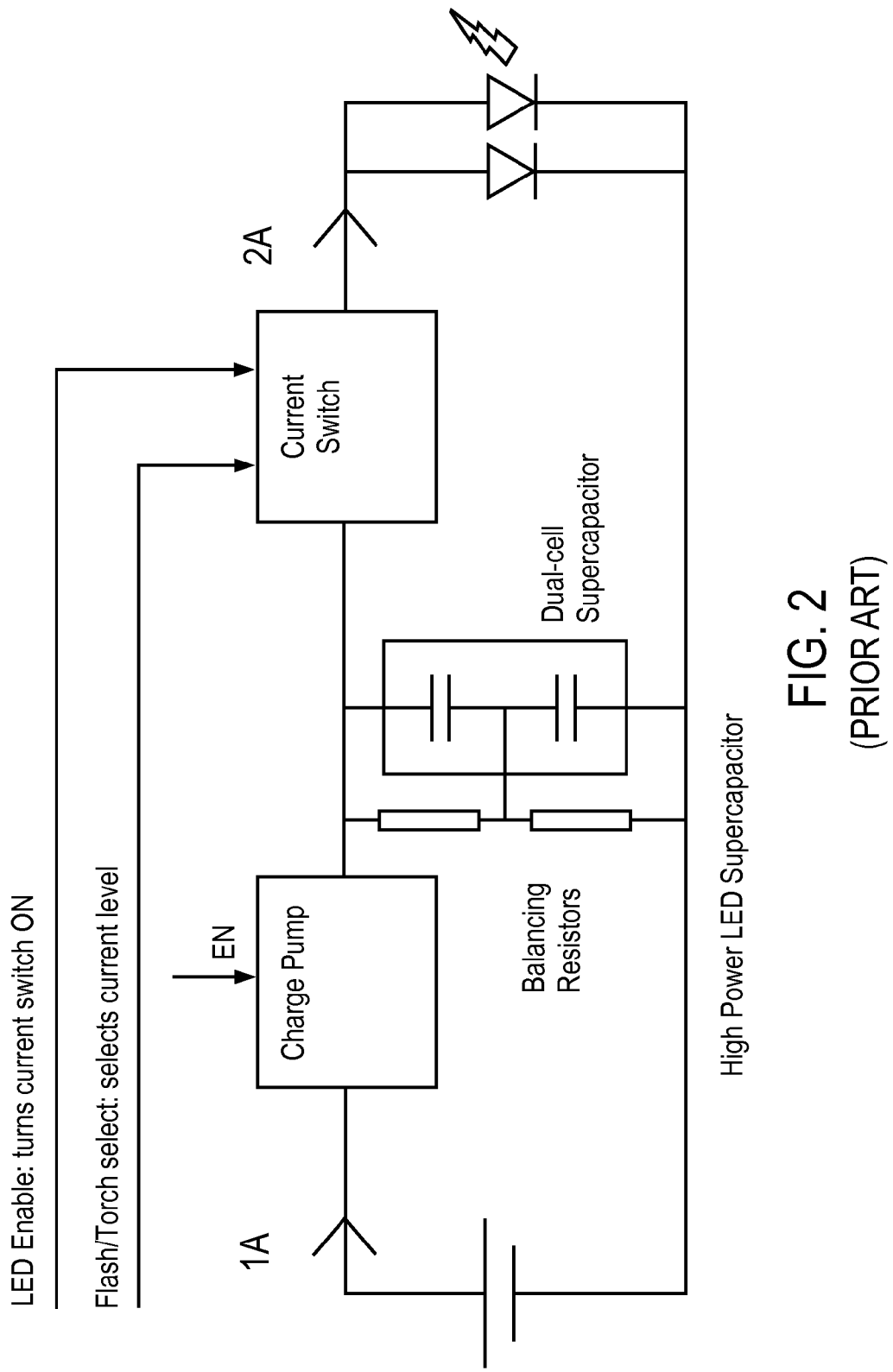
FIG. 2 illustrates a charge circuit with a supercapacitor used in a flash application.
Figure 3:
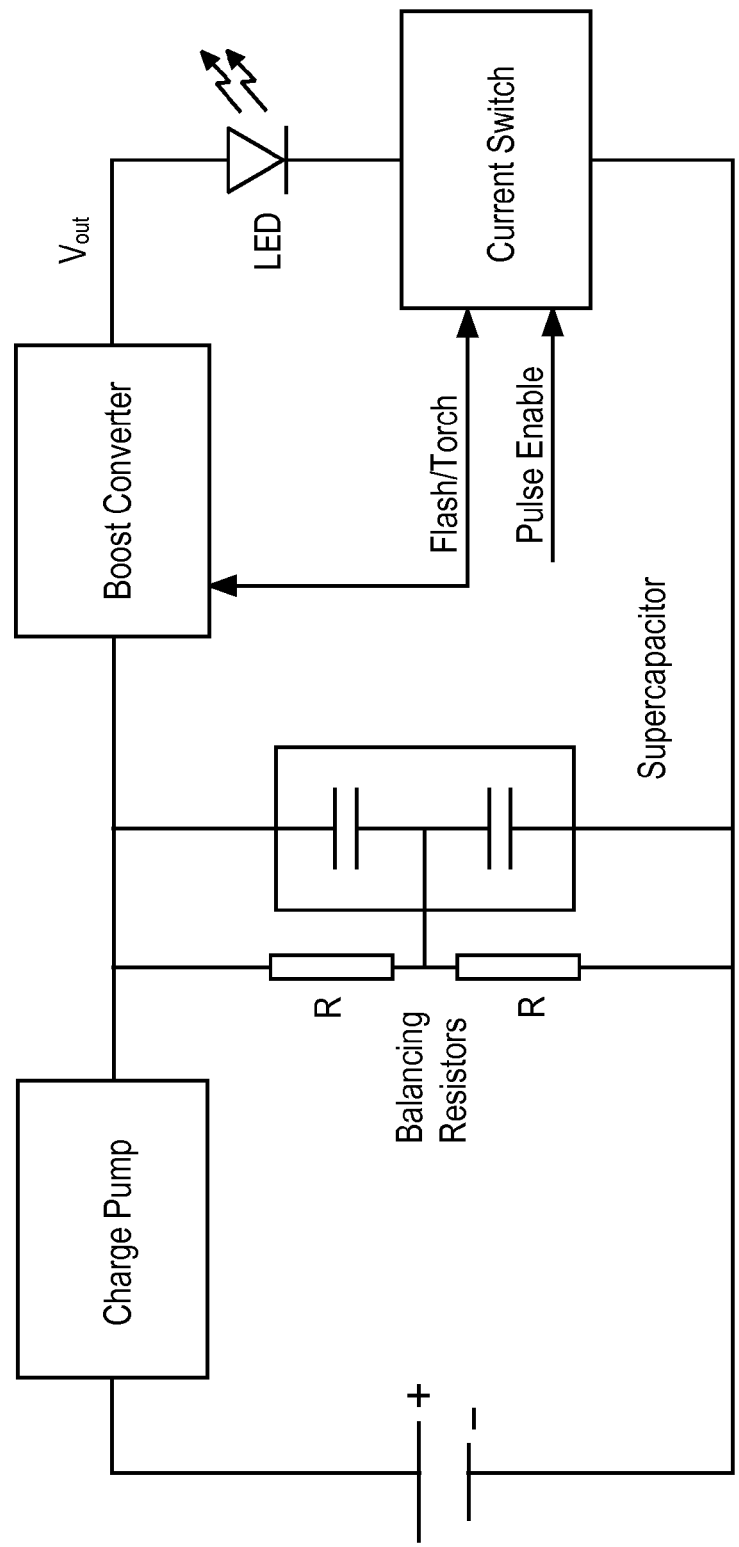
FIG. 3 shows a combination of the supercapacitor and boost converter.
Figure 4B:
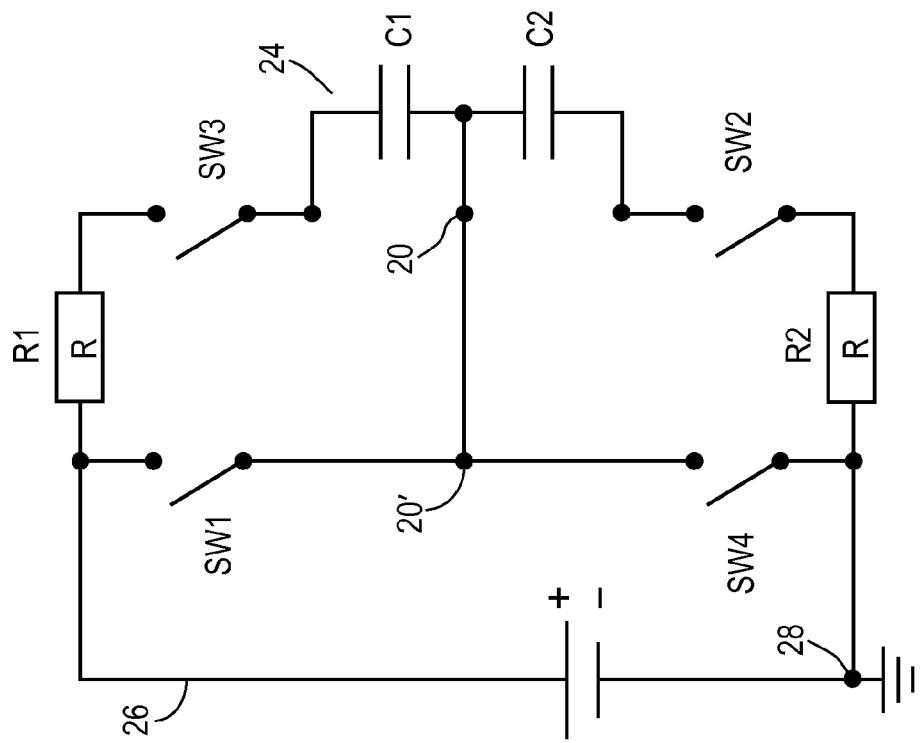
FIGS. 4A-4H are diagrams of various implementations of a charge circuit with switches to control the charge cycles.
Figure 4A:
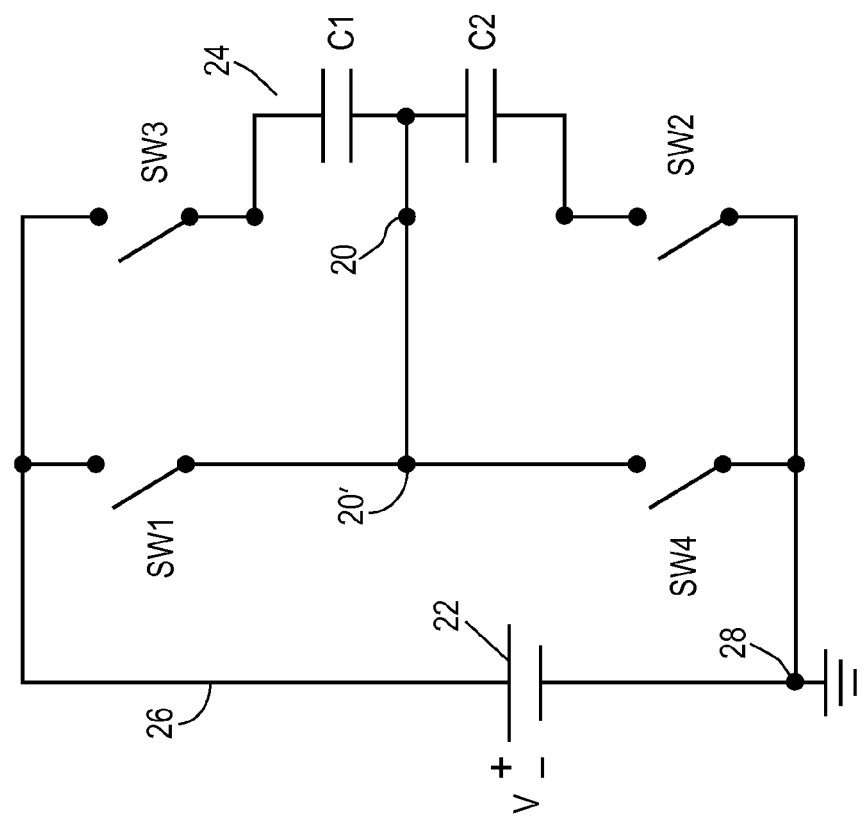

FIG. 4A illustrates one possible embodiment of a charge circuit. As illustrated, the charge circuit 10 includes a battery 22 connected between a voltage supply lead 26 and a ground lead 28. Note that leads can be viewed broadly as any connection means, including conductors, connection points, rails etc. In this charge circuit, there are four switches SW1-4 and a supercapacitor 24. The four switches can be configured with diodes, transistors (FET (field effect transistor), JFET (junction FET), MOSFET (metal oxide FET), or bipolar) or other components, discrete or otherwise, that can perform switch functions; and, as will be further explained, they need ground and voltage supply leads (rails) isolation. The supercapacitor 24 is connected between the voltage supply and ground leads via switches SW3 and SW2, respectively. The supercapacitor 24 has two capacitor components C1, C2 and a center tap 20. The two remaining switches, SW1 and SW4, are connected in series between the voltage supply and ground leads 26 and 28. In turn, these switches SW1 and SW4 are connected at their series connection point 20' to the center tap 20 of the super capacitor; or they may be connected directly to the center tap 20.

In operations, the four switches are switched on/off one pair at a time, SW1-SW2 and SW3-SW4 respectively, to create two separate conductive paths that share the center tap 20, one through capacitor component C1 and one through capacitor component C2. Specifically, when switches SW1 and SW2 are turned on (closed state), the current passes from the voltage supply lead to the ground lead through switch SW1, center tap 20, capacitor component C1 and switch SW2, thereby charging C2; and when switches SW3 and SW4 are turned on, the current passes through switch SW3, capacitor component C1, center tap 20 and switch SW4. The two pairs of switches operate substantially exclusively with one pair being turned on and the other off at any given time. Each of the two paths can stay on until the respective capacitor component is fully charged, or they can stay on for a partial charge and flip back and forth between them until both capacitor components are fully charged. This applies similarly during charge refresh cycles. Advantageously, no other external component is required.

Figure 4D:
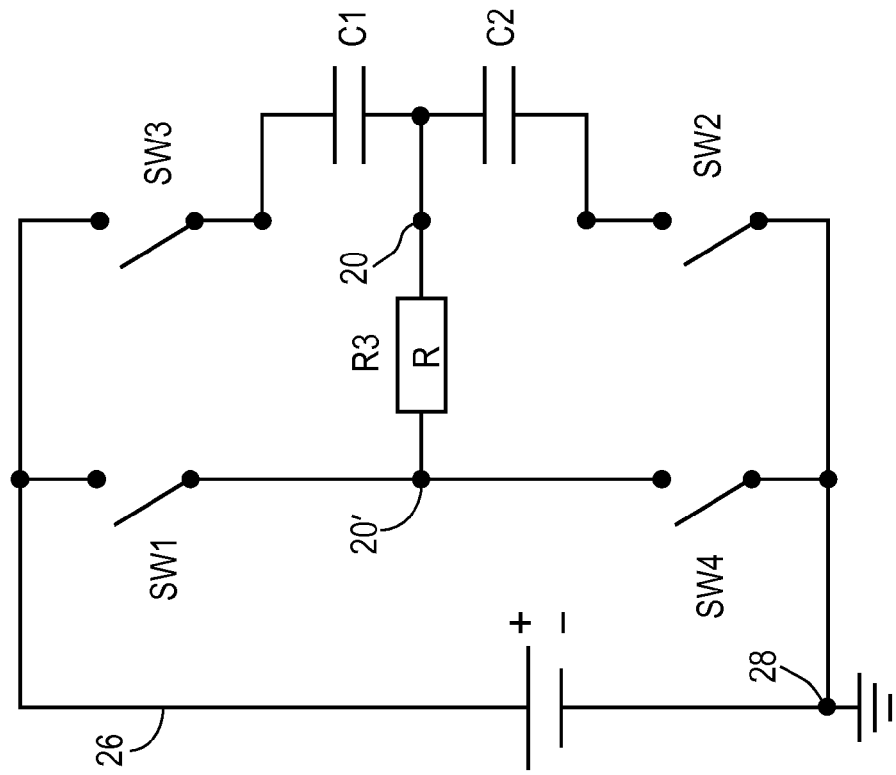
Figure 4C:
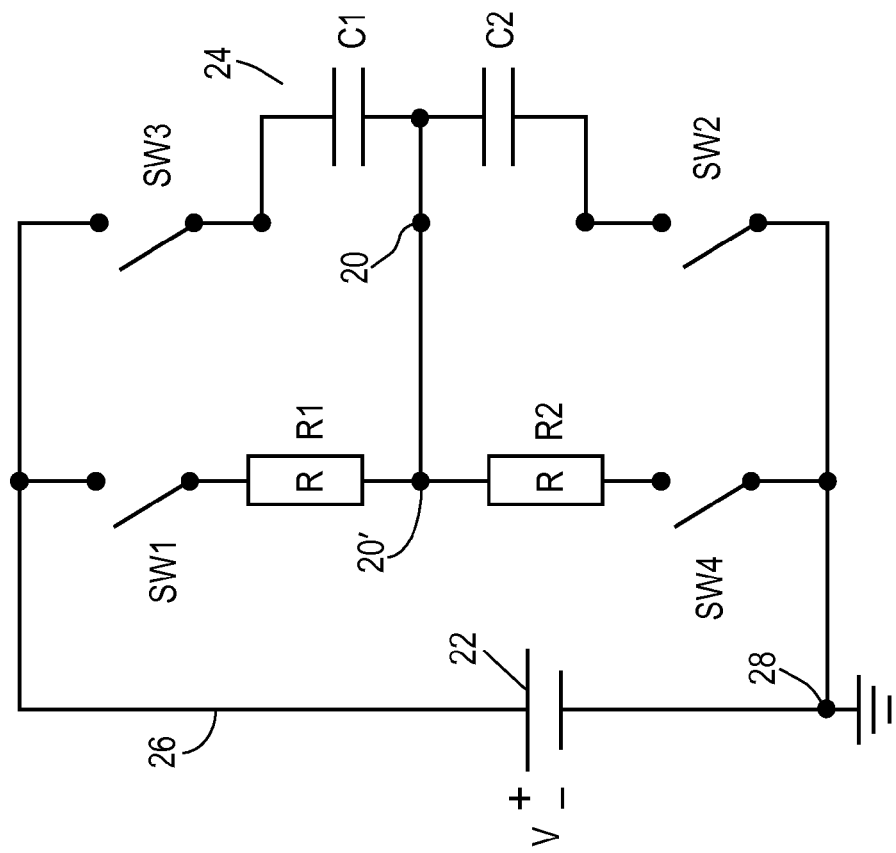
Figure 4F:
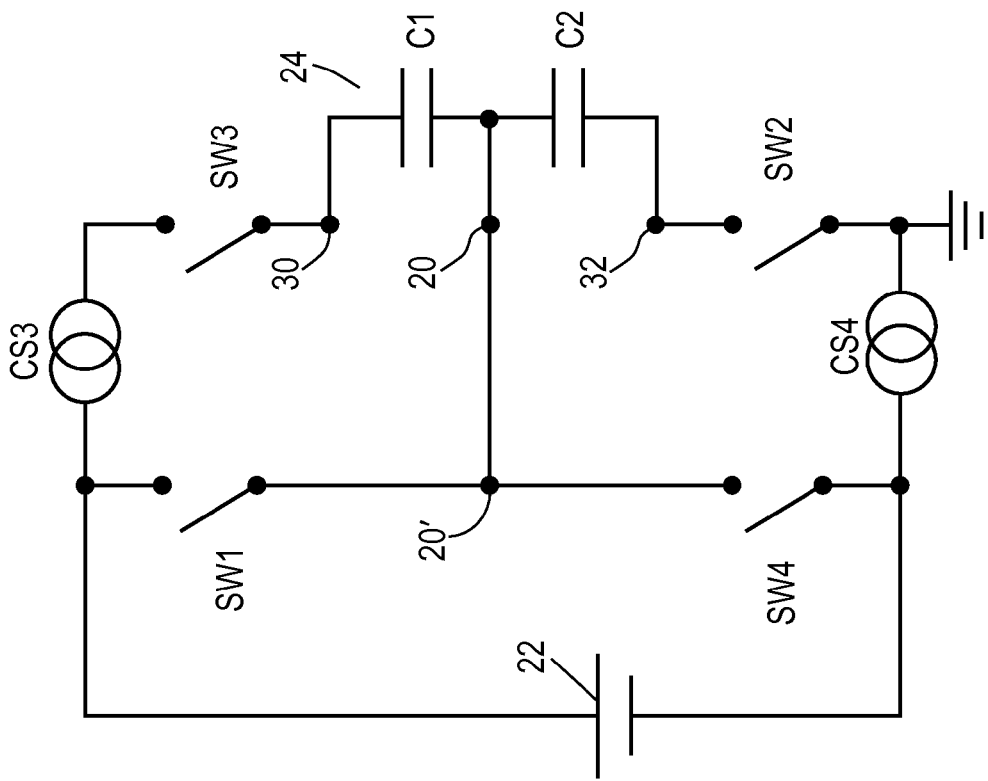

The charge circuit 11 illustrated in FIG. 4B is a variation of the foregoing embodiment with the addition of current limiting resistors. With the exception of the current limitation capability and possibly change in RC time constant (i.e., charge time), the principle of operations of charge circuit 11 is otherwise similar and producing similar advantages. In FIG. 4C, the illustrated charge circuit 12 is similar in most respects to that in FIG. 4B except that the resistors are located in a different part of the path. This configuration may be selected over the former if, for instance, this way the circuit or IC layout is physically easier to accomplish. In the charge circuit 13 illustrated in FIG. 4D there is only one resistor R3 that is shared by both paths. Using the same part, R3, for both paths is possible because the two paths operate substantially exclusively. This resistor part and installation costs saving is translated also to better product availability (because fewer components translate to longer MTBF (mean time between failure) and shorter MTTR (mean time to repair)).

Figure 4E:
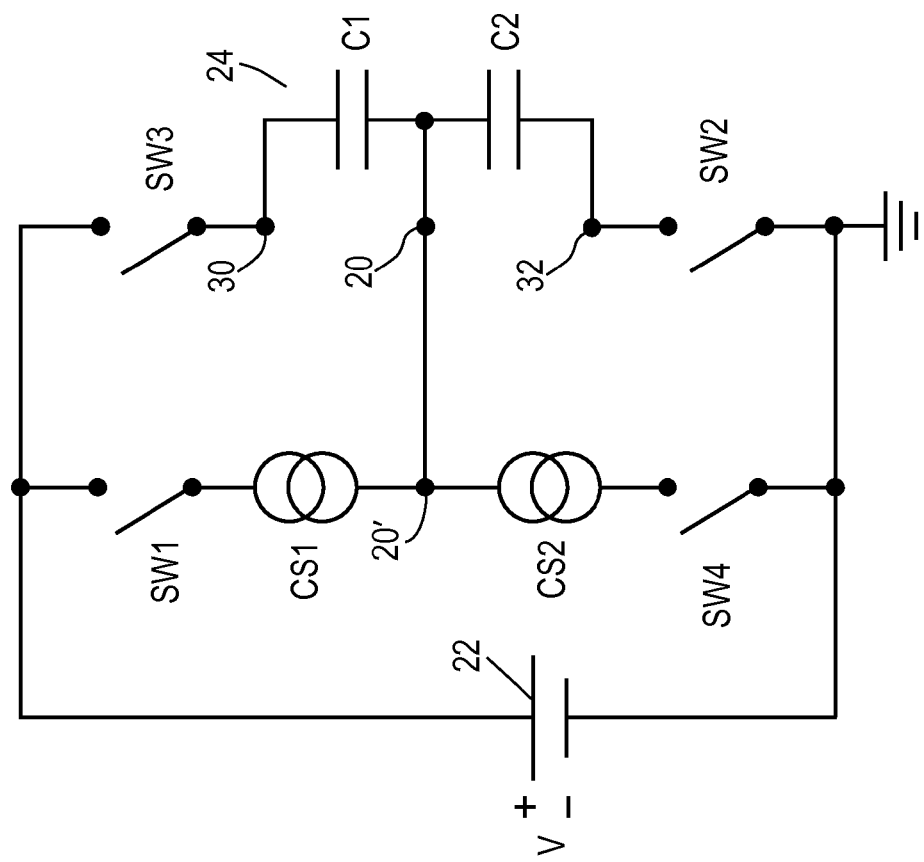
Figure 4H:
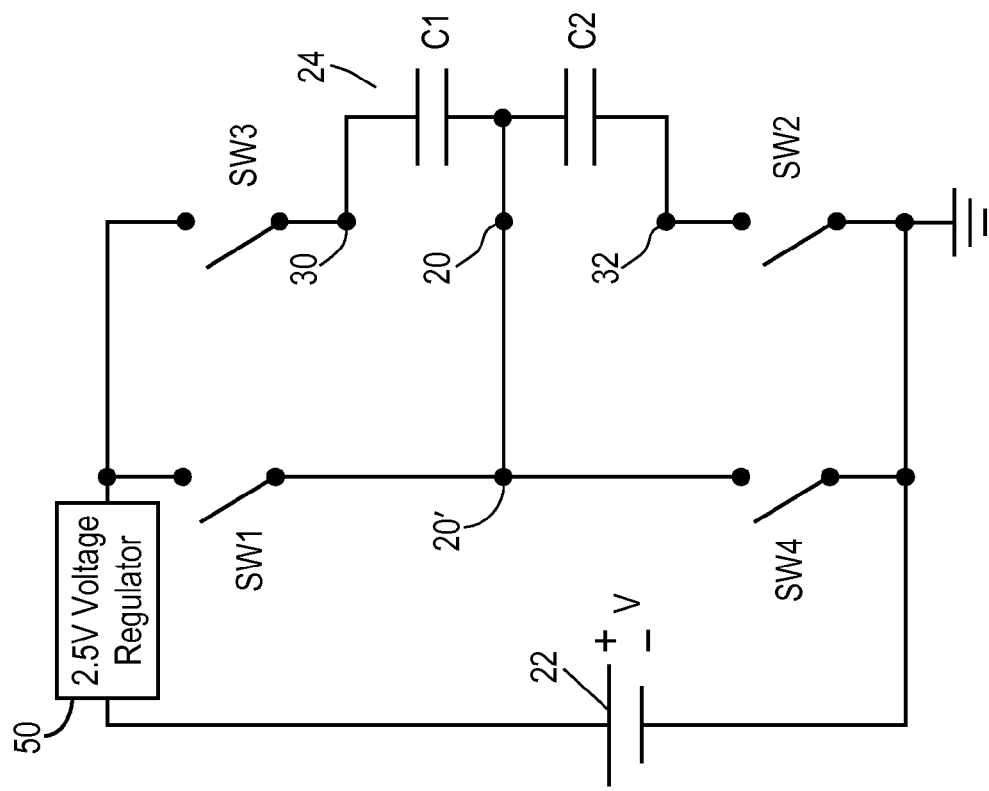
Figure 4G:
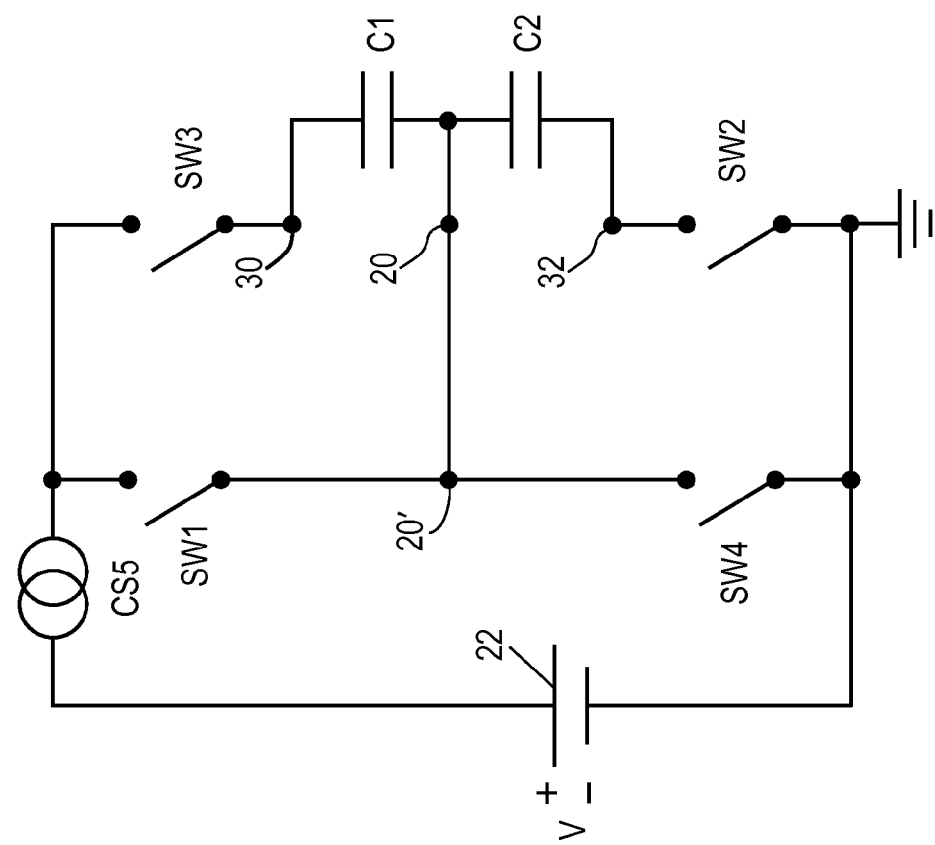

FIGS. 4E through 4H are further variations of the foregoing designs with the addition of current sources (or sinks, e.g., resistors) CS1-2, CS3-4, CS5, respectively, to the charge paths (in series with switches SW1-4). In each of these implementations, the current sources limit the level of battery current available for charging the supercapacitor, regardless of their location, as they are disposed in the respective charge paths. For example, the current source CS1 is in series with the switch SW1, C2 and switch SW2 as shown in FIG. 4E. Another example, as shown in FIG. 4G, uses one current source CS5 in series with the battery (inserted in the voltage supply lead). In this configuration the current source is shared by both paths, one path at a time. Another way for limiting or regulating the battery current is by using a voltage regulator 50, as shown in FIG. 4H.

Figure 5B:
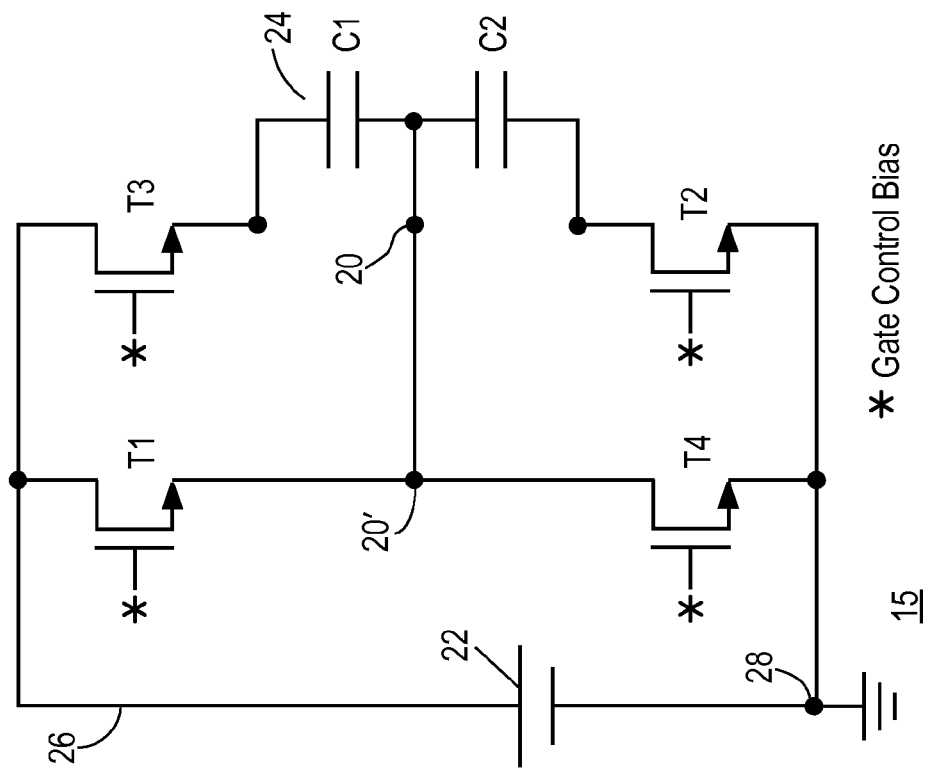
Figure 5A:
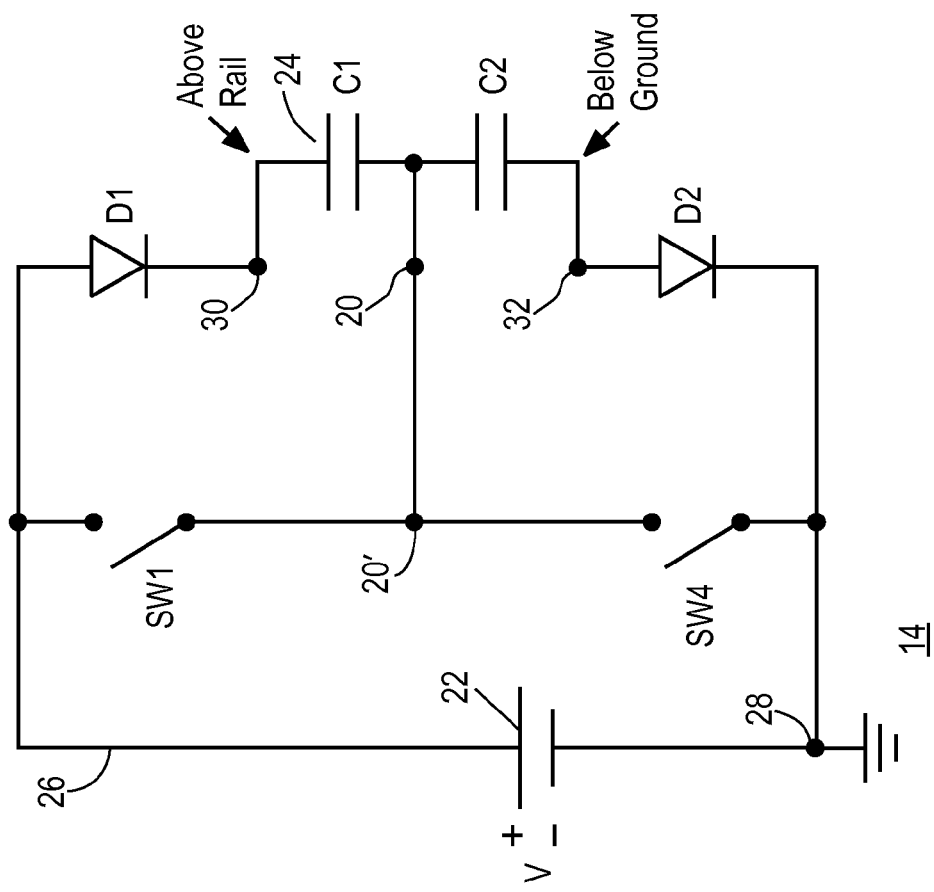

In an alternative embodiment, as shown in FIG. 5A, the charge circuit 14 includes two diodes D1 and D2 that stand for the generic switches SW3 and SW2. In operation, when either of the switches SW1 or SW4 are turned on the voltage drop across them is substantially zero (depending on the type of switch device it may be somewhat higher than zero). Also, when the switch SW1 is turned on (closed) the diode D1 is reverse biased, whether the capacitor portion C1 is charged or not; and when the switch SW4 is turned on (closed) the diode D2 is reverse biased. In order for these conditions to exist there is a need to maintain the aforementioned voltage supply and ground rails isolation relative to connection points 30 and 32.

To further explain why the diodes D1 and D2 take turns in being respectively reverse biased, we first assume that neither of the capacitor portions C1 and C2 is charged and we secondly assume that they are charged. In the first scenario, when SW1 is turned on and C1 is not charged, the voltage across the diode D1 is substantially zero or equal to the voltage drop across SW1; and, similarly, when SW4 is turned on the voltage across the diode D2 is substantially zero or equal to the voltage drop across SW4. If the respective on voltage across the switch SW1, SW4 is lower than the forward bias voltage of the corresponding diode D1, D2, the diode cannot conduct. Accordingly, the switch and diode components are selected to allow this condition to exist. In the second scenario, when SW1 is turned on and C1 is charged, the voltage across the capacitor portion C1 is positive relative to the voltage supply lead 26 and the center tap 20 and, in absolute terms, it equals to the battery voltage minus the drop across SW1. In other words, the voltage at point 30 is higher than that at the voltage supply lead (i.e., higher than the rail voltage). Therefore, diode D1 is reverse biased and will continue so until SW1 is turned off and SW4 is turned on. As noted before, this condition is made possible only because of the isolation of point 30 from the voltage supply lead 26. Further in the second scenario, when SW4 is turned on and C2 is charged, the voltage across the capacitor portion C2 is negative relative to the ground lead 28 and the center tap 20 and, in absolute terms, it equals to the battery voltage minus the drop across SW41. In other words, the voltage at point 33 is lower than ground. Therefore, diode D2 is reverse biased and will continue so until SW4 is turned off and SW1 is turned on. Again, this condition is made possible only because of the isolation of point 33 from the ground lead 28. As before, this approach allows the charge circuit 14 to charge and refresh each capacitor component independently without any substantial loss of charge from the battery.

The charge circuit 15 illustrated in FIG. 5B is a variation of the foregoing circuit. In this implementation, transistors T1 and T4 stand for the switches SW1 and SW4 and transistors T3 and T2 stand for the diodes D1 and D2. As shown, the four transistors may be N-channel FET, JFET or MOSFET with proper gate biasing (or NPN bipolar with proper base level control). In operation, transistor T3 is maintained at off state when transistor T1 is turned on; and, respectively, transistor T2 is maintained at the off state when transistor T4 is turned on. This way, with the proper isolation from voltage and ground rails 26 and 28 as explained before, each capacitor component C1 and C2 can be charged in turn, one capacitor component at a time. Incidentally, when both capacitor components are substantially fully charged, the voltage between points 30 and 32 is twice the battery voltage minus the on voltages of T1 and T4.

Figure 5E:
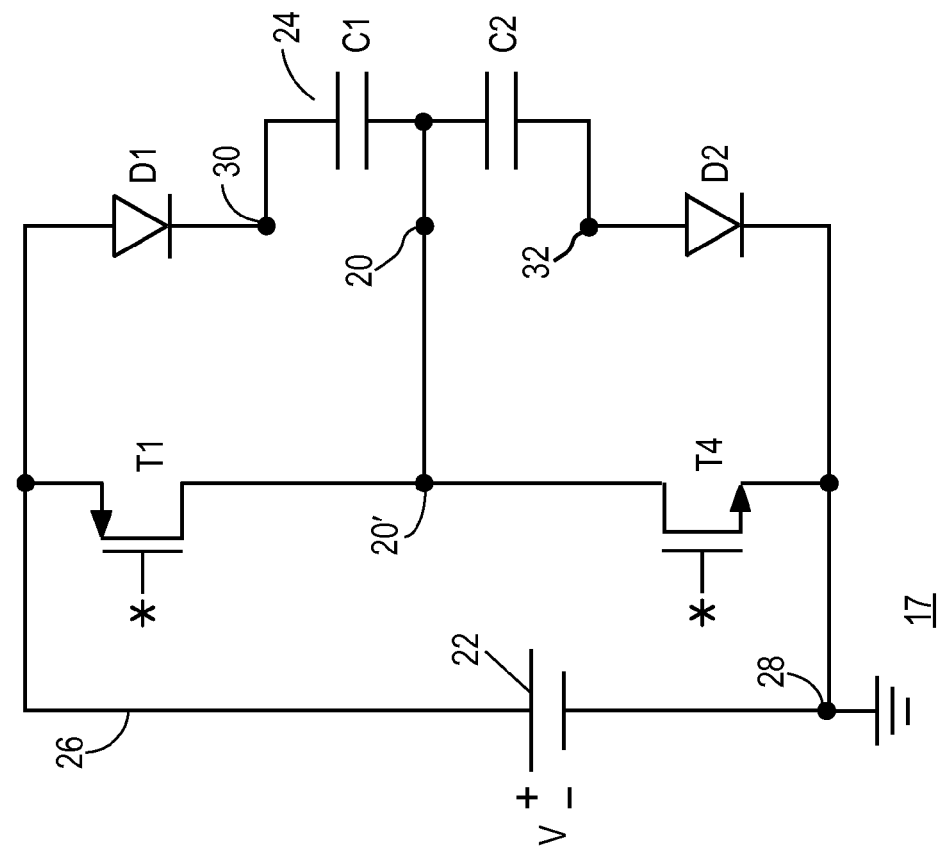
Figure 5C:
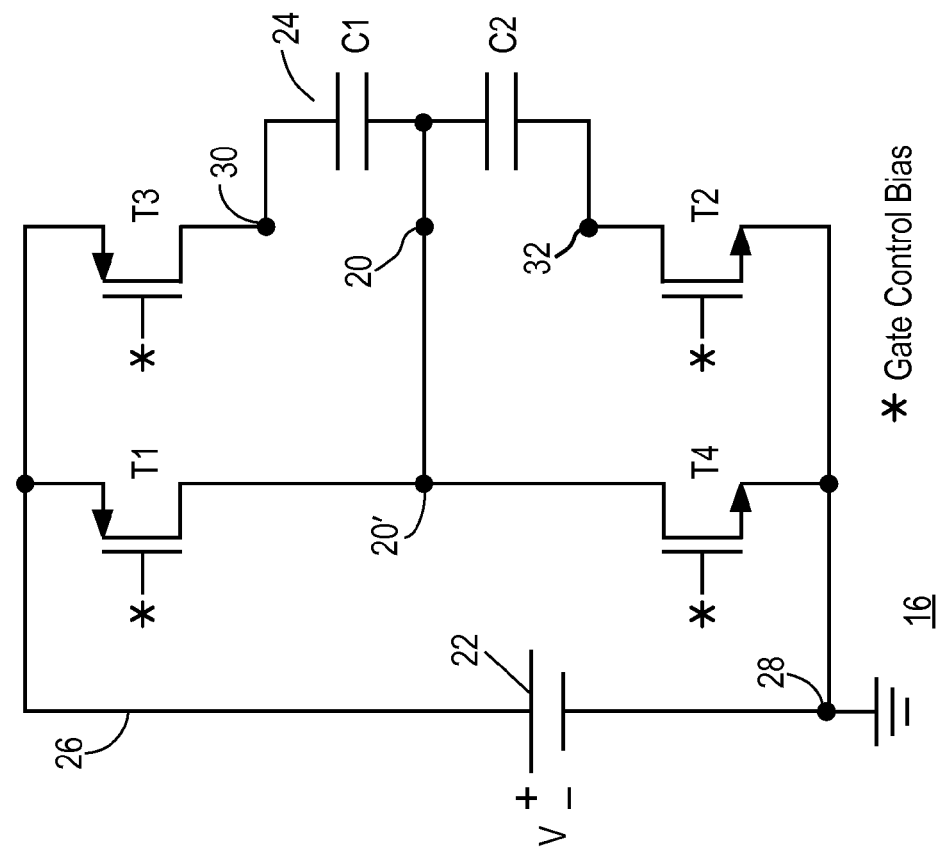

The charge circuit 16 illustrated in FIG. 5C is similar in structure and operations to the foregoing circuit (FIG. 5B) except for the type of transistors and gate control biasing. In this implementation two of the four transistors T1, and T3 may be P-channel FET or MOFET (or PNP bipolar with proper base level control). FIG. 5D(1) and FIG. 5D(2) are provided to illustrate the operations of charge circuit 16. As shown, in each charge phase a different one of the capacitor components C1 and C2 is being charged. In phase (1), transistor T3 is the floating component because of its bias (point 30 higher than rail voltage) and is maintained in the off state. In this phase capacitor component C2 is being charged. In phase (2), transistor T2 is the floating component because of its bias (point 33 lower than ground) and is maintained in the off state. In this phase capacitor component C1 is being charged. In both phases alike, one of the components is a floating component in that is source bias is higher/lower than the rail voltage/ground. This is only possible if the components are designed and fabricated to allow such rail/ground isolation.

The charge circuit 17 illustrated in FIG. 5E is again a variation of the foregoing circuits with the transistors T1 and T4 being P-channel and N-channel respectively, and with the diodes D1 and D2 standing for transistors T3 and T2, respectively. In operation, D1 is off when T1 is switched on and capacitor component C2 is charging; and D2 is off when T4 is switched on and capacitor component C1 is charging.

Figure 6:
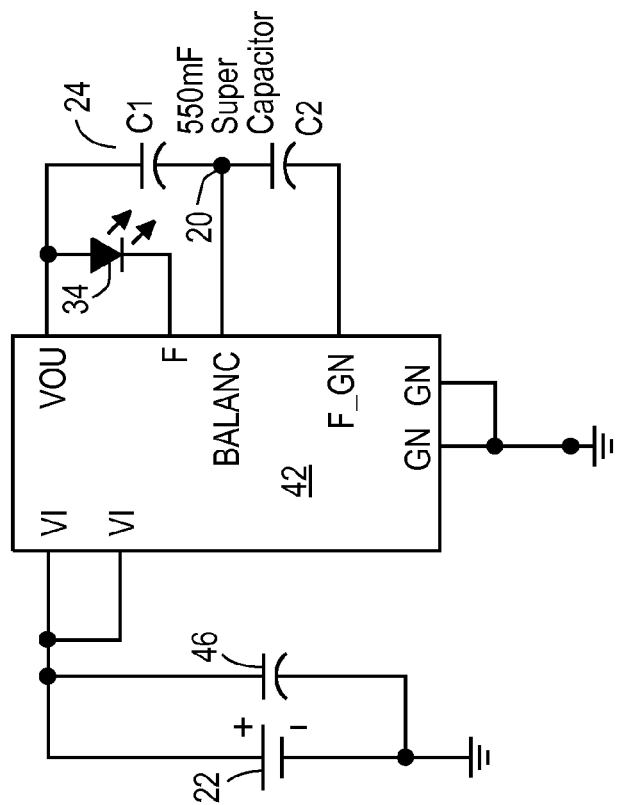
FIG. 6 illustrates two possible implementations of the foregoing circuits in an IC.
Figure 6:
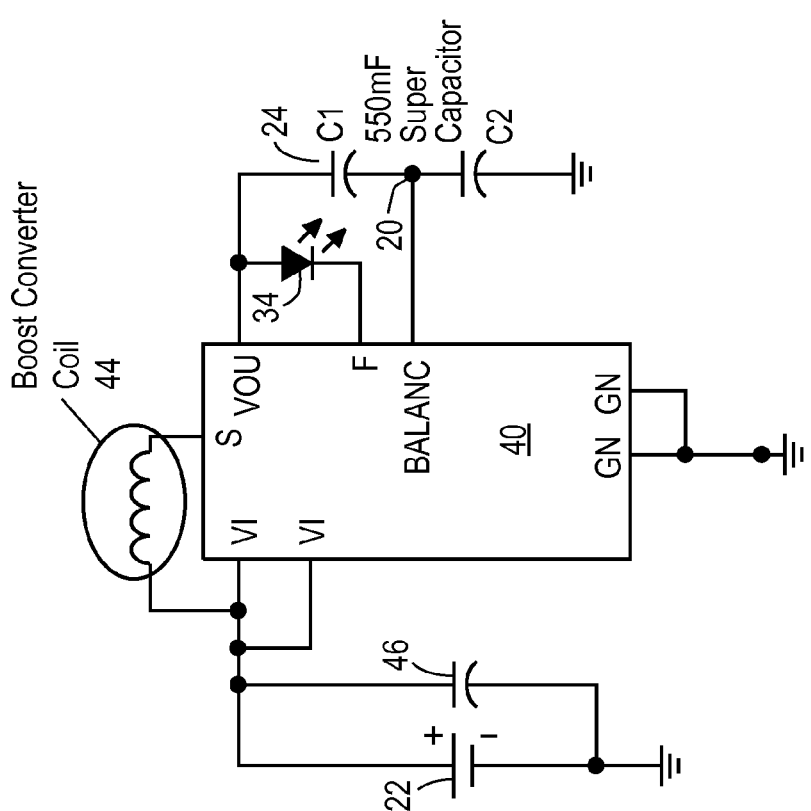

FIG. 6(1) and FIG. 6(2) illustrate two possible implementations of the foregoing circuits in an IC. As shown in both implementations, the charge circuit 40/42 is substantially included on the IC and the external components are limited in number and include the battery 22, a capacitor 46 across the battery, the LEDs 34 and the super capacitor 24. The capacitor 46 across the battery is another energy reservoir provided to handle current surges (or peak current) demands from the circuit. In one instance, as FIG. 6(1) shows, the charge circuit 40 includes a boost converter for higher voltage applications and in that case the circuit includes also boost converter coil 44.

Figure 7A:
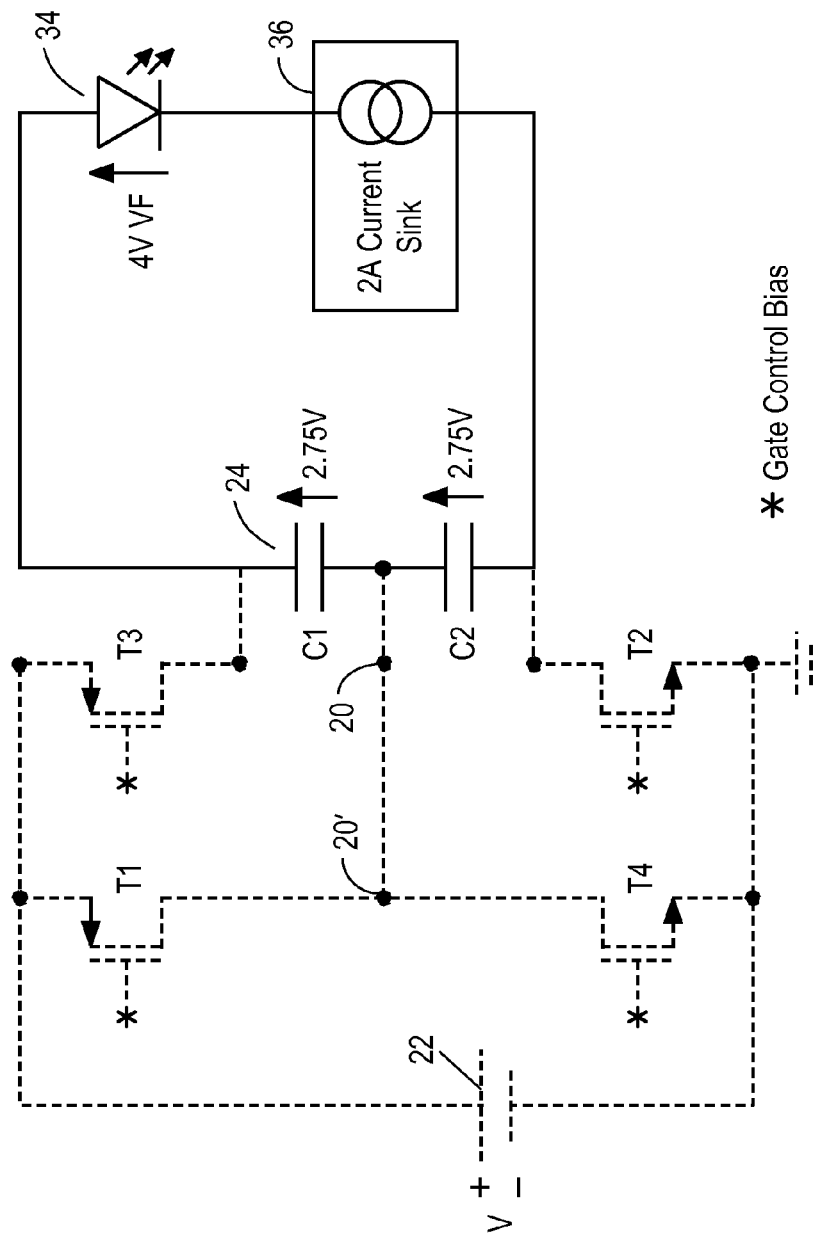
FIGS. 7A & 7B are diagrams of two example of a charge storage acting as an energy reservoir for the white LEDs.

FIG. 7A is a diagram illustrating a charge storage acting as an energy reservoir for the load, such as white LEDs. In the illustrated charge circuit 18, the pair of capacitor components C1 and C2 (supercapacitor 24) is used as the charge storage. This charge storage is operatively coupled to the LEDs 34 and, assuming it is properly charged, providing the burst power for flash operations or continuous (lower) power for torch light or movie operations. The flash current is passing through a current sink (e.g., resistor 36) adapted for, say, 2 A or more current level. The current sink, or resistor, 36 is needed because the forward voltage drop across the white LEDs is smaller than the total voltage across the supercapacitor 24 (and the current sink drops the difference). The charge circuit 18 for charging the capacitor components is shown in dotted line because the flash current sink 34 is independent from the charge cycle and, in turn, from the capacitor components C1 and C2 (supercapacitor 24). Indeed, charge refreshing can take place while a flash operation is active, although sufficient level of charge is needed for such flash operations. Moreover, the charge circuit may be configured in various ways as indicated above and the configuration in dotted line is replaceable by any of the others.

Figure 7B:
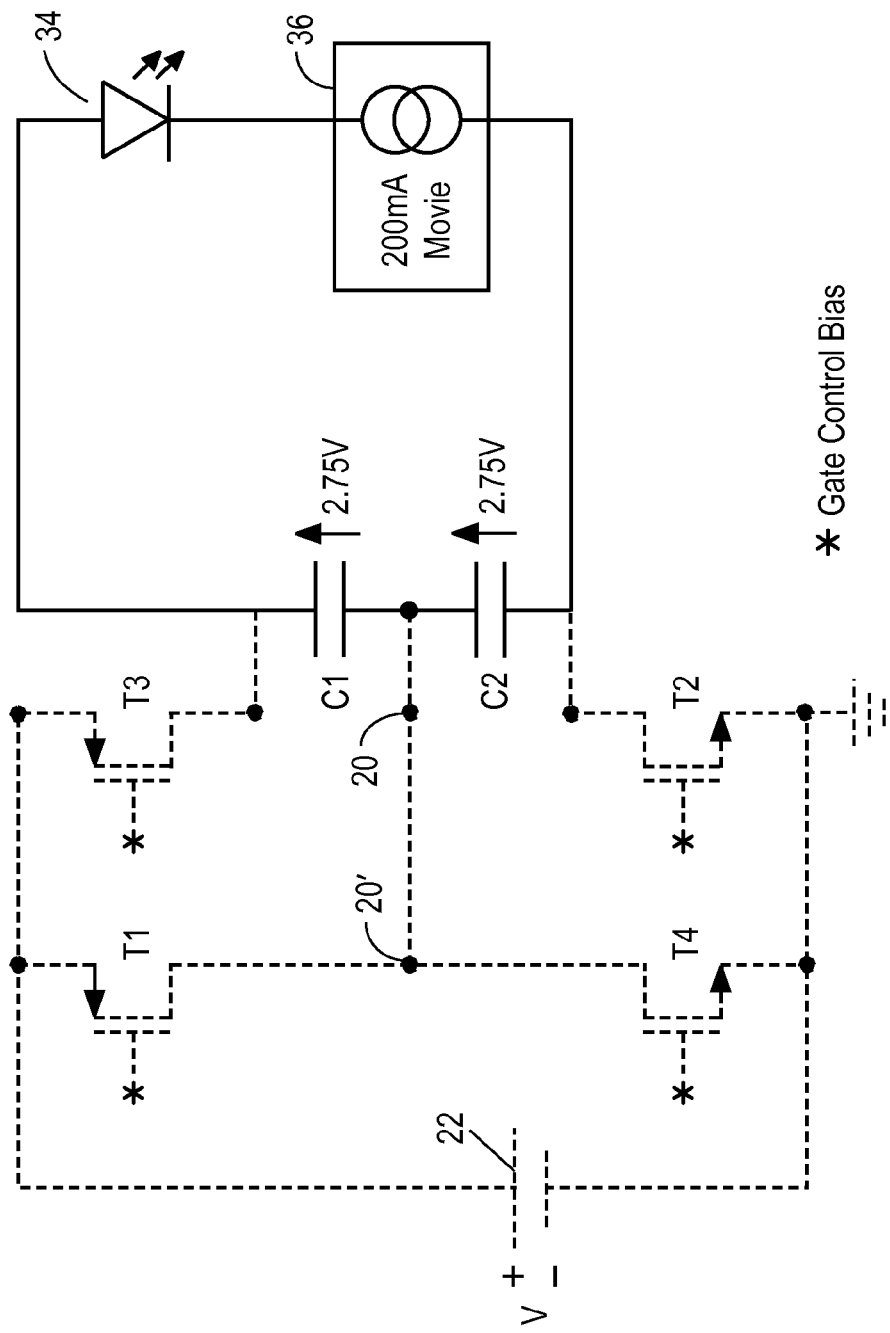

FIG. 7B shows a variation of the foregoing circuit as it is used for movie operations. Again, the charge circuit 18 is shown in dotted line because the charge energy supply to the white LEDs is independent of the charge cycles and the charge circuit can be implemented in a number of configurations. For movie operations the current sink 36 is in the range of, say, 200 mA, and the current sink circuit 36 will float between, say, −2.75V and +2.75V (i.e., $+V_{battery}-V_{on(T3+T4)}$ and $-V_{battery}+V_{on(T1+T2)}$), during charging or charge refreshing process.

Figure 8A:
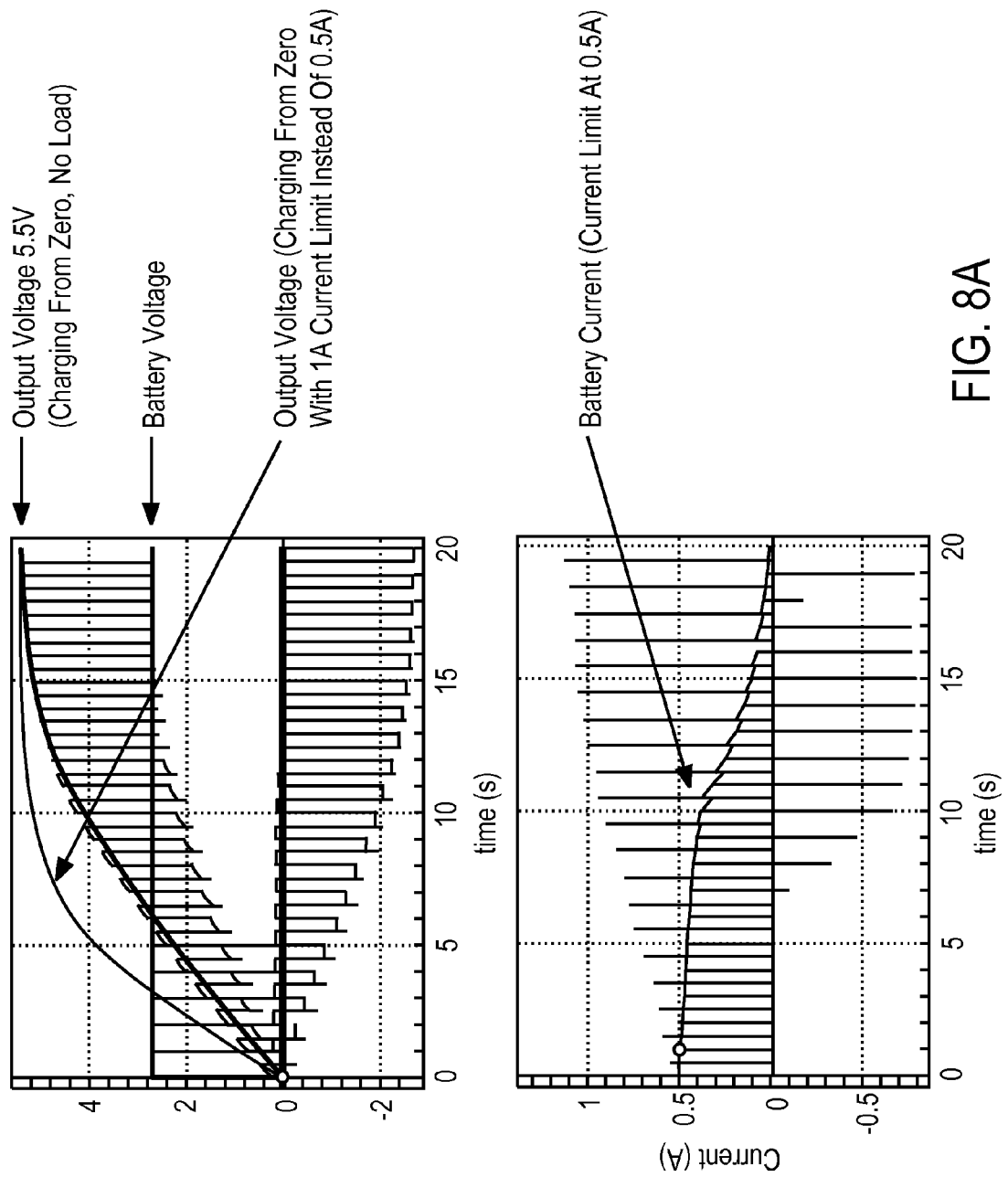
FIGS. 8A-8C are graphs of voltage output (battery output) and battery current over time during charging process, with and without load current (8A), at 1 Hz and 0.05 Hz charging frequency and battery current limit of 0.5 A (8B), and of output voltage and load current during movie operations with current load of 200 mA (8C).
Figure 8B:
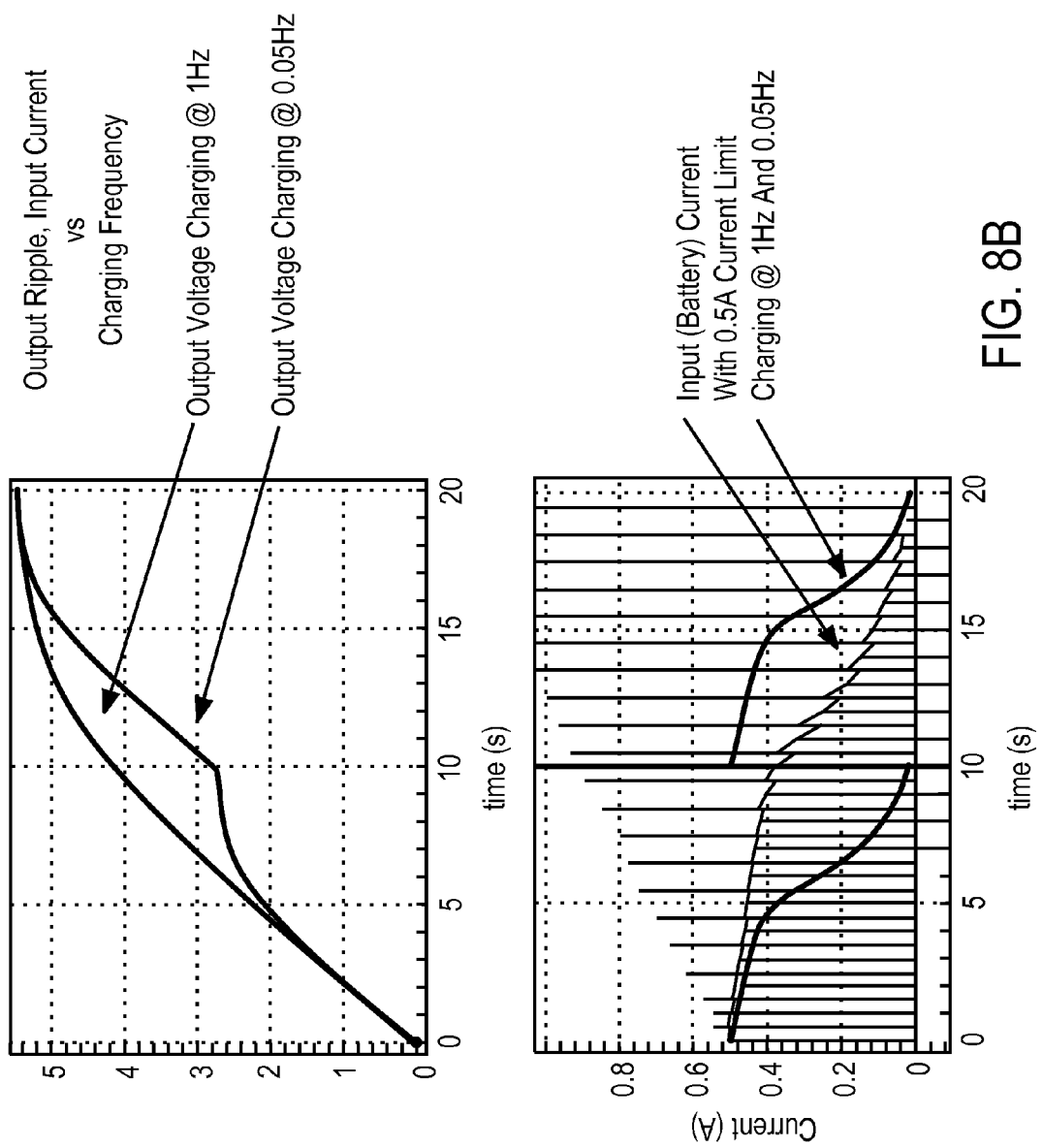
Figure 8C:
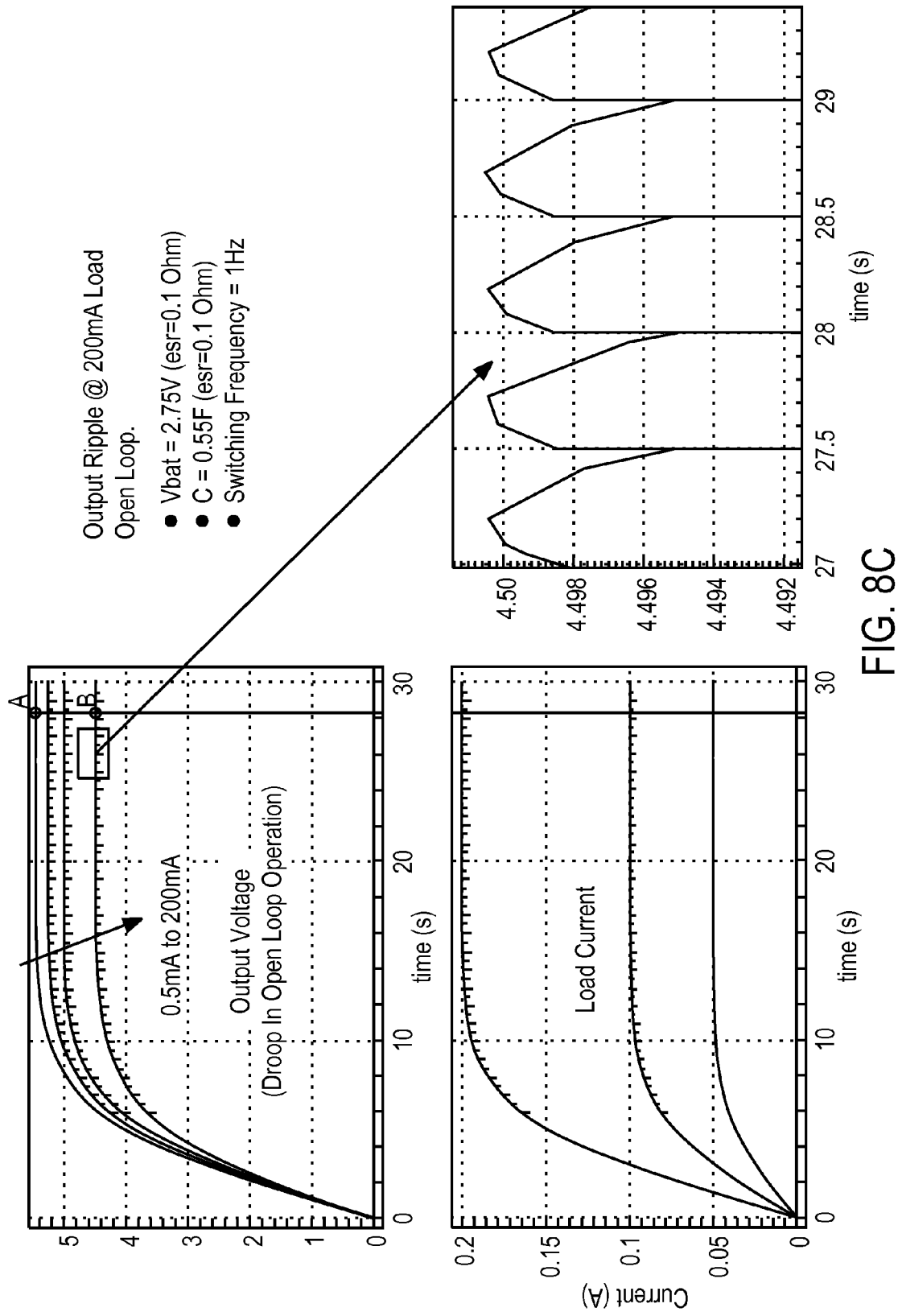

To further illustrate the operations of a charge circuit configured according to an embodiment of the invention, FIG. 8A shows graphs of voltage output (battery output) and battery current over time during charging process, with and without load current. The output voltage is analyzed over time for 1 A load current, relative to the battery voltage. FIG. 8b shows graphs of output voltage and battery current over time during charging process, at 1 Hz and 0.05 Hz charging frequency and battery current limit of 0.5 A. Additionally, FIG. 8C shows graphs of output voltage and load current during movie operations with current load of 200 mA, for instance.

In view of these graphs and the foregoing examples of charge circuit, a number of additional observations can be made. It is noted, for instance, that the circuit topologies need not include charge pumps and that the charging of the supercapacitor can be made directly from the battery with the supercapacitor being isolated from the voltage supply and ground rails (i.e., the supercapacitor is floating). Moreover, there is no flying (switched between input and output) capacitor charge bucketing from the input to the output. Thus, the current source can be used to charge the supercapacitor with a controlled steady input (battery) current minimizing the input noise.

In addition, for flash operations, which are one-time energy burst events, the charging frequency is not important, particularly since the charge time is on the scale of seconds. All that s needed is a properly charged supercapacitor. No matter how fast the charge state is switched the limited battery current will result is the charging or charge refreshing taking time on the scale of a few seconds. For movie (torch light) operations, the charge frequency will impact the ability to sustain the load as well as the output ripple (see, e.g., FIGS. 8B and 8C). The choice of the frequency may be affected by noise filtering considerations over the audio range.

Figure 9A:
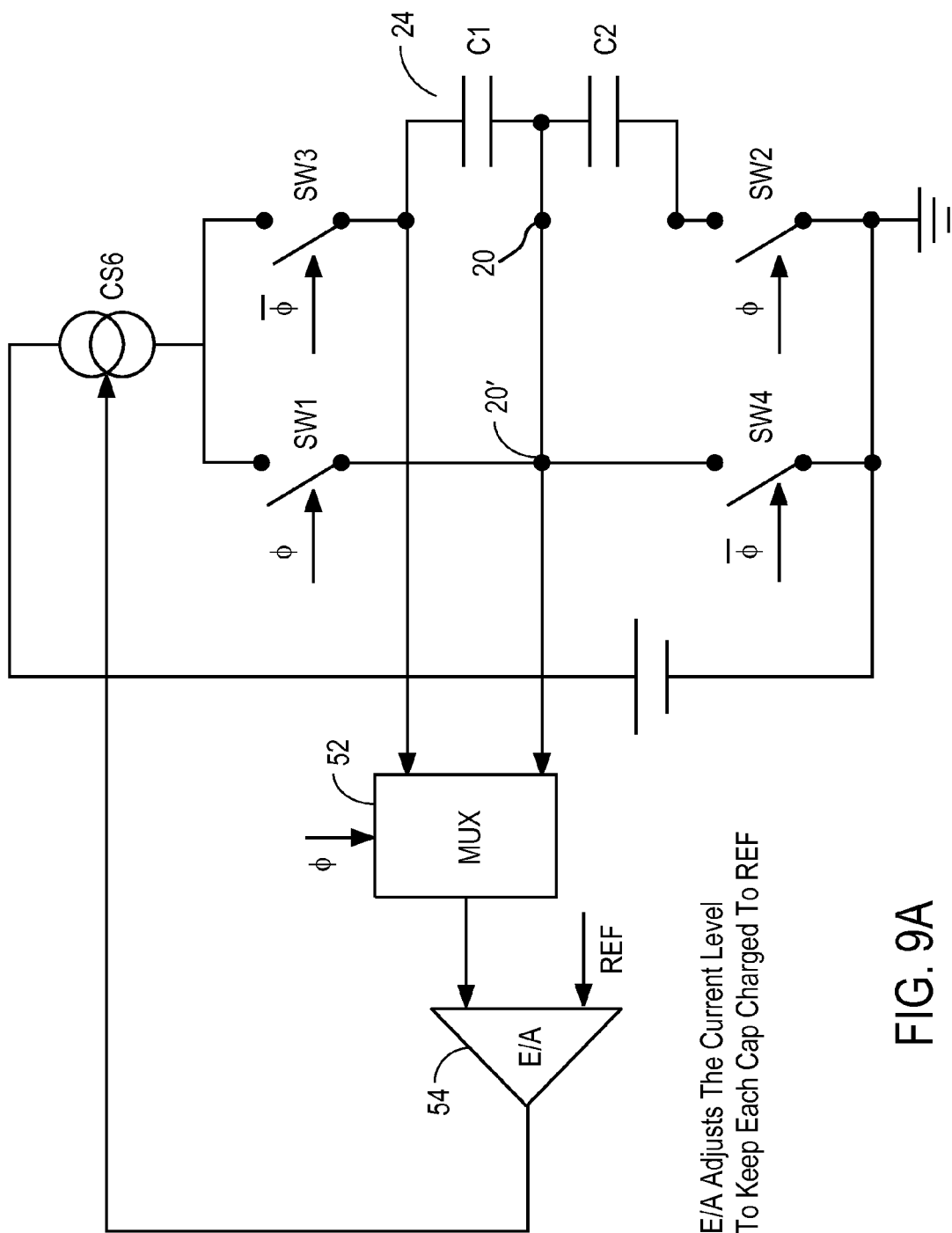
FIGS. 9A & 9B illustrate a charge circuit with loop control circuits.
Figure 9B:
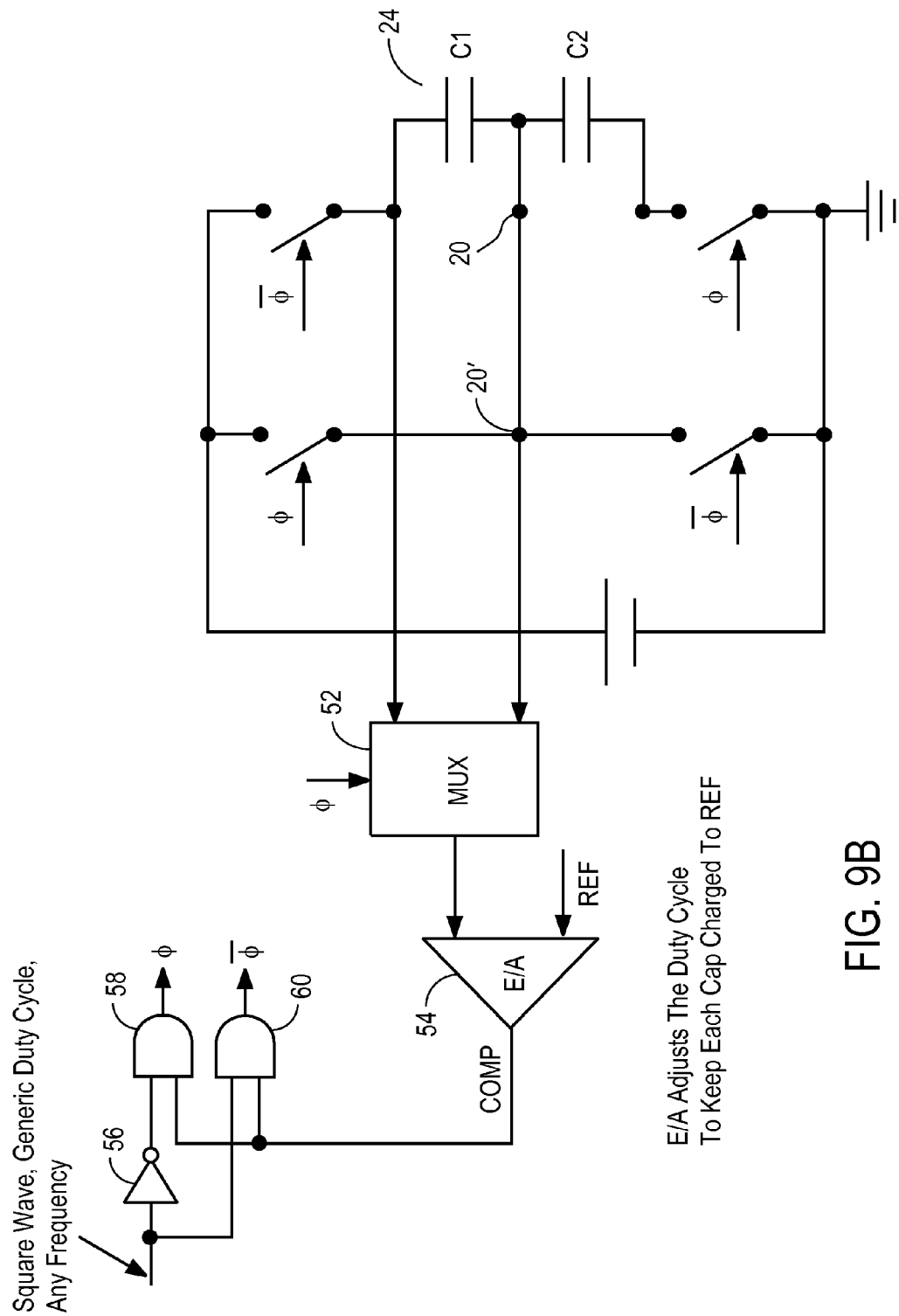
Figure 10A:
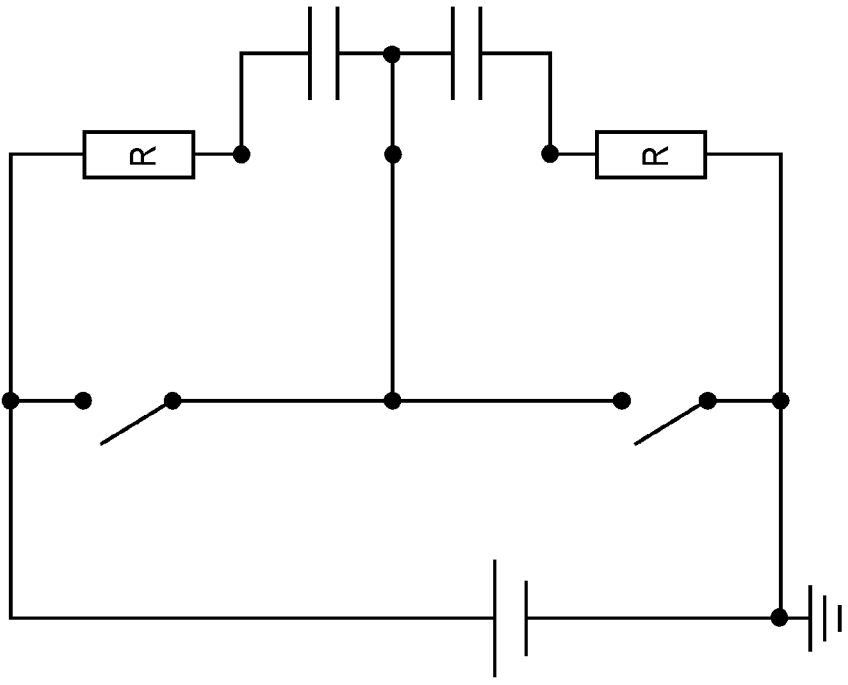
FIGS. 10A-10D illustrate additional embodiments of the charge circuit.
Figure 10A:
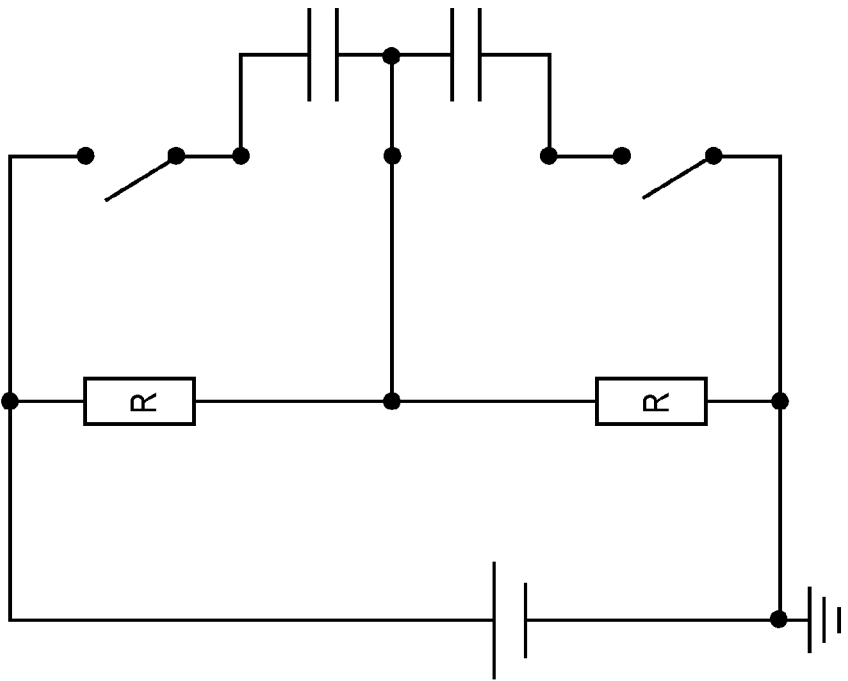
Figure 10B:
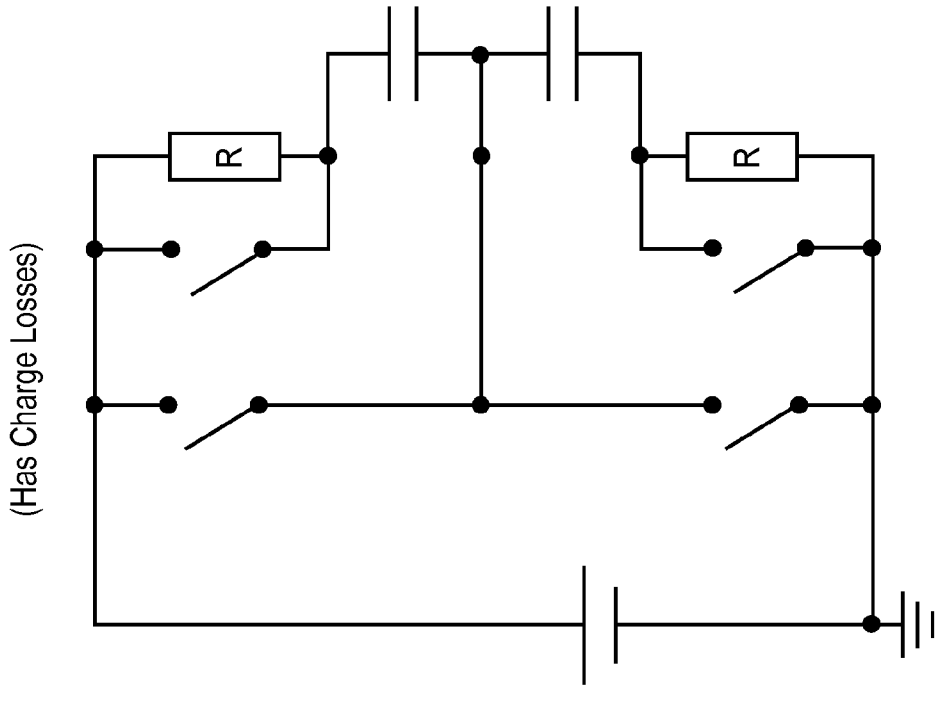
Figure 10B:
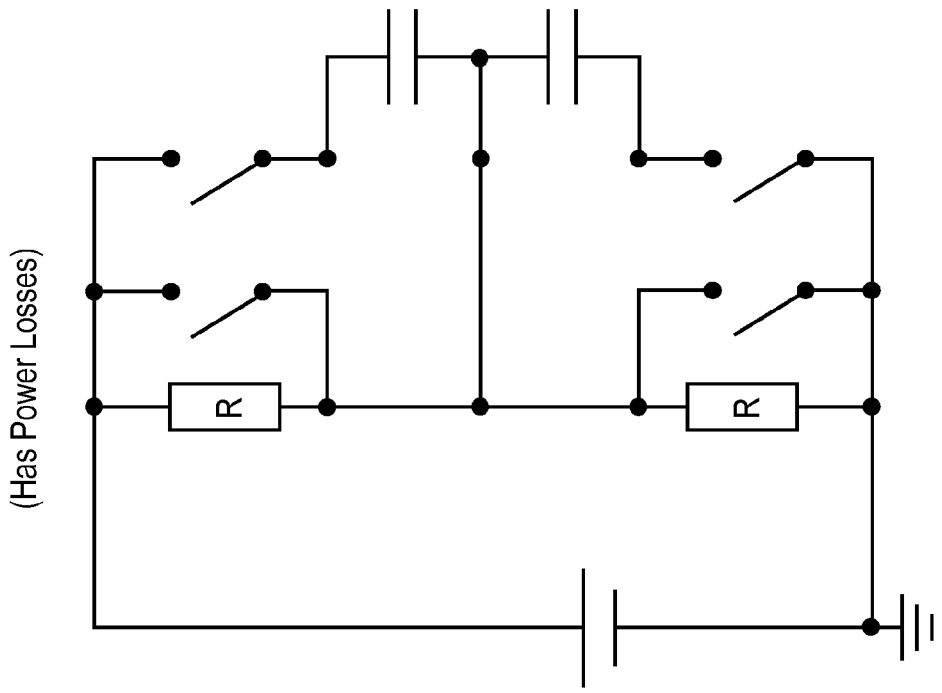
Figure 10C:
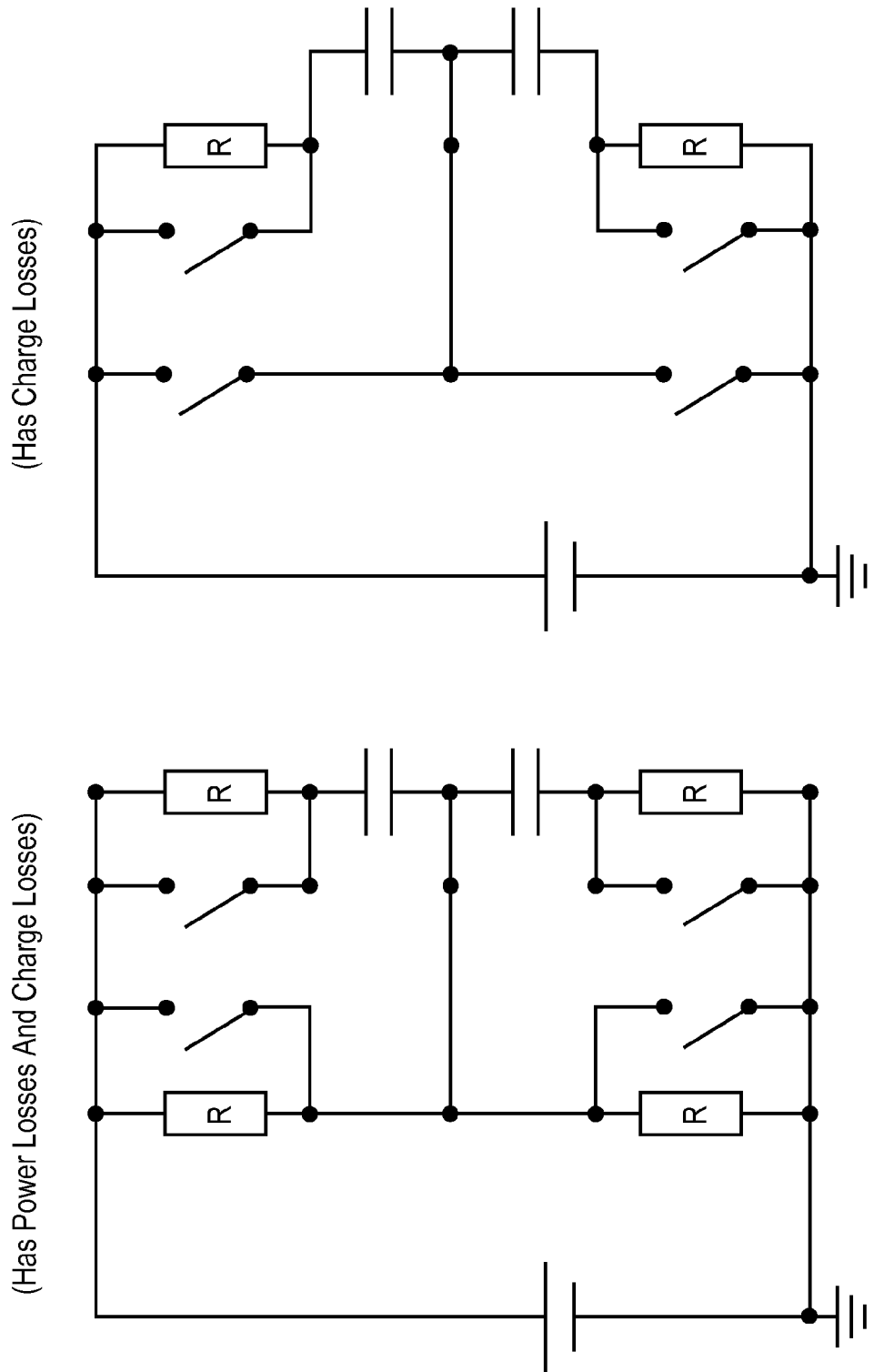
Figure 10D:
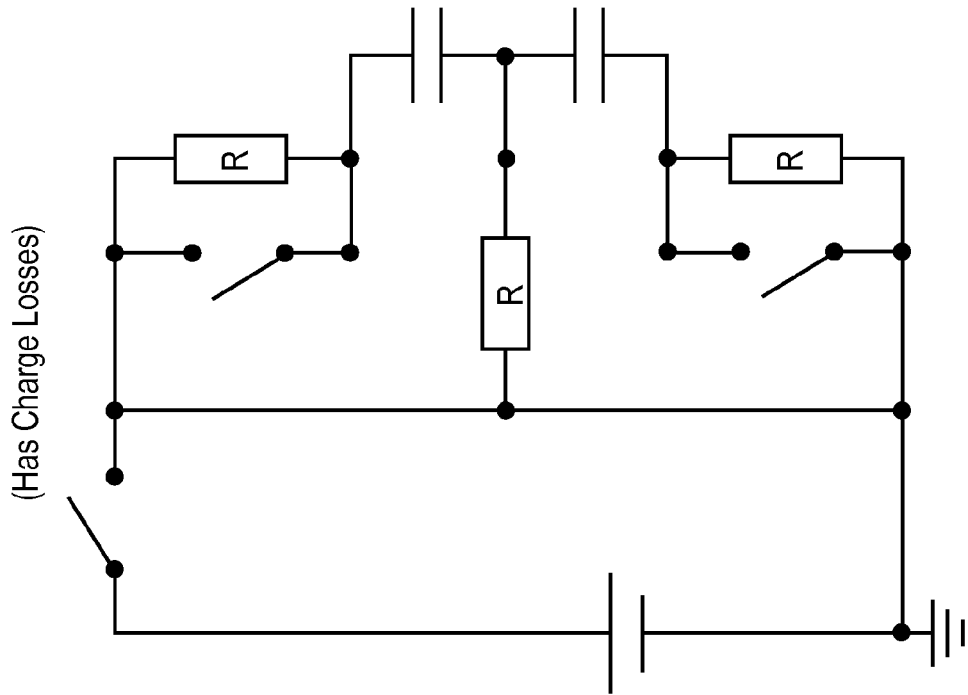
Figure 10D:
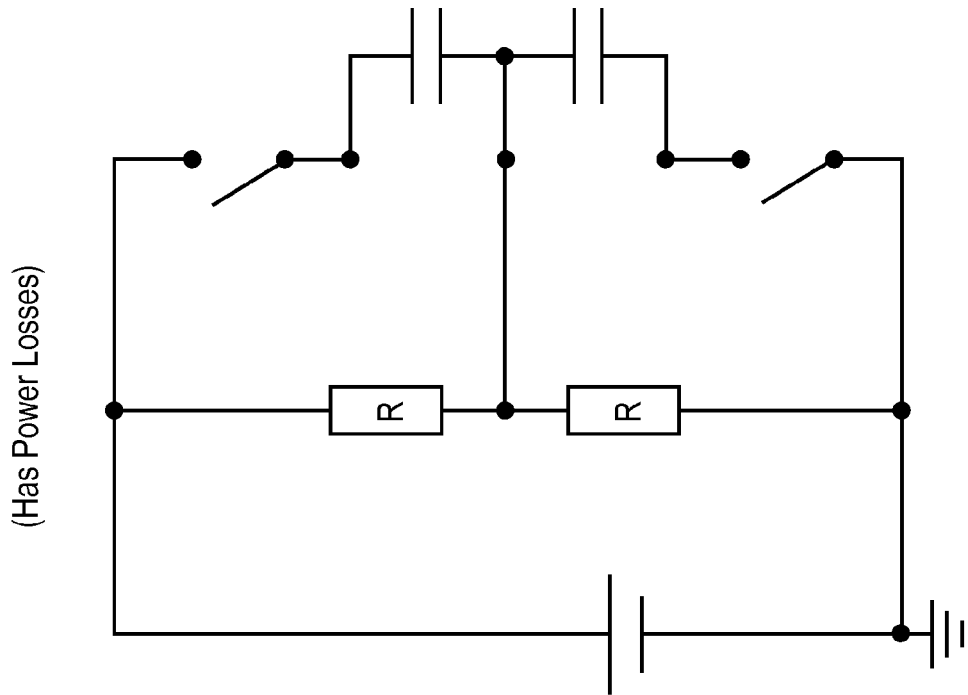

As mentioned, the capacitor components may be each charged completely or they may be each charged partially in cycles switching back and forth between them repeatedly until they reach full charge. To implement the latter, a voltage regulator can be put in front of the charging paths, or loop control circuits are added as shown in FIGS. 9A and 9B. Essentially, in the circuit of FIG. 9A, the capacitor voltage is sensed during each charge cycle and it is compared with the reference voltage input to the amplifier 54 to adjust the current supply. The current supply CS6 may be a current source, or a variable resistor or a number of resistors with switches to connect them in series or parallel configuration. Alternatively, the circuit illustration of FIG. 9B provides the circuit portions 54, 56, 58 60 for deriving the control signal $\phi$ and its complementary control signal $\bar{\phi}$ where a square wave controls the switching duty cycle. This way, in both configurations only one of the paths is sensed via the multiplexer 50 at any given time. However, note that there could be two control loops with each controlling each charging path. Two control paths ('on' or 'off') could be used in parallel instead of multiplexing the controller. In this example, the reference voltage (REF) determined the switching point and in turn adjusts the charge (battery) current level.

FIGS. 10A-10D represent additional embodiments with resistors standing for transistors. As shown, placement of the resistors may produce power losses and/or charge losses. Moreover, a switch can be connected across a resistor to reduce these effects. Note that, in different embodiments, resistors can be replaced with current sources and/or with transistors; and switches that turn the charging paths 'on'/'off' can be replaced with current sources, transistors, or diodes, as previously exemplified. The transistors, like resistors, would carry current limited by their physical dimensions and/or their biasing. The current sources could have control inputs with continuous or step adjustments (therefore eliminating the need for the switches).

In sum, although the present invention has been described in considerable detail with reference to certain preferred versions thereof, other versions are possible. Therefore, the spirit and scope of the appended claims should not be limited to the description of the preferred versions contained herein.

What is claimed is:

1. A device comprising:
    a power source with a positive lead and a negative lead;
    charge storage with a first capacitor component and a second capacitor component coupled in series, and a center tap between the first capacitor component and the second capacitor component;
    a first charge path including a first positive switch and a first negative switch and disposed between the positive lead and the negative lead, the first charge path traversing the first capacitor component and the center tap but not traversing the second capacitor component, the first capacitor component and the center tap disposed between the first positive switch and the first negative switch, the first positive switch and the first negative switch being dedicated to the first charge path; and
    a second charge path including a second positive switch and a second negative switch and disposed between the positive lead and the negative lead, the second charge path traversing the second capacitor component and the center tap but not traversing the first capacitor component, the second capacitor component and the center tap disposed between the second positive switch and the second negative switch, the second positive switch and the second negative switch being dedicated to the second charge path, each of the first and second charge paths being controllable to allow charge current to flow from the power source to one or substantially simultaneously to both of the first and second capacitor components.

2. The device of claim 1 wherein the power source is a battery.

3. The device of claim 1 wherein the charge storage is configured as a supercapacitor.

4. The device of claim 1 wherein the charge storage is configured with two capacitors in series.

5. The device of claim 1 wherein the first and second charge paths are controllable to switch between open and closed states so that at any given time one or both of them are in the closed or open state.

6. The device of claim 5 wherein the first and second charge paths are controllable to switch to the open state in order to avoid cross conduction therebetween or overheating thereof or when charging the charge storage is substantially complete.

7. The device of claim 5 wherein the first and second charge paths are controllable to switch to the closed state to allow discharging the first or second capacitor component with a low current level.

8. The device of claim 1 wherein each of the first and second charge paths includes a pair of switches, one switch of each pair of switches being coupled in series with the first and second capacitor components respectively, one switch being disposed upstream and one switch being disposed downstream from the respective one of the first and second capacitor components.

9. The device of claim 8 wherein each of the first and second charge paths further includes a resistor in series with the switches.

10. The device of claim 9 wherein the resistor is attached to the center tap and is shared by the first and second charge paths.

11. The device of claim 9 wherein each of the first and second charge paths has its own resistor.

12. The device of claim 8 wherein the switches are transistors.

13. The device of claim 8 wherein two of the switches are transistors and two of the switches are diodes.

14. The device of claim 12 wherein the transistors are bipolar, FET (field effect transistor), JFET (junction FET), or MOSFET (metal oxide FET).

15. The device of claim 12 wherein two of the transistors are NPN or N-channel and the other two are PNP or P-channel.

16. The device of claim 8 wherein each of the first and second charge paths further includes a current source in series with the switches.

17. The device of claim 8 wherein the first and second charge paths further include a current source common to both of them in series with the switches.

18. The device of claim 8 wherein the first and second charge paths further include a voltage regulator common to both of them in series with the switches.

19. The device of claim 1 wherein each of the first and second charge paths includes a plurality of devices, each plurality of devices being coupled in series with the first and second capacitor components respectively, with at least one device being disposed upstream and one device being disposed downstream from the respective one of the first and second capacitor components.

20. The device of claim 19 wherein each plurality of devices includes any combination of two or more from a switch, resistor, transistor, diode, voltage regulator and current source.

21. The device of claim 1 wherein the first and second charge paths are controllable to allow up-down continuous or step adjustment of the charge current according to charge conditions of the charge storage.

22. The device of claim 1 embodied in an IC (integrated circuit) or as a functional block in an IC.

23. The device of claim 22 wherein the power source, the charge storage, or both, are external to the IC.

24. A device for providing charge energy to a load, the device comprising:
a power source with a positive lead and a negative lead;
charge storage with a first capacitor component and a second capacitor component coupled in series, and a center tap between the first capacitor component and the second capacitor component;
a load operatively coupled across the charge storage to receive charge energy from the charge storage;
a first charge path including a first positive switch and a first negative switch and disposed between the positive lead and the negative lead, the first charge path traversing the first capacitor component and the center tap but not traversing the second capacitor component, the first capacitor component and the center tap disposed between the first positive switch and the first negative switch, the first positive switch and the first negative switch being dedicated to the first charge path; and
a second charge path including a second positive switch and a second negative switch, the second charge path traversing the second capacitor component and the center tap but not traversing the first capacitor component, the second capacitor component and the center tap disposed between the second positive switch and the second negative switch, the second positive switch and the second negative switch being dedicated to the second charge path;
the first and second charge paths being adapted to pass charge current from the power source substantially separately to one of the first or second capacitor components.

25. The device of claim 24 further comprising a current limiting device in series with the load and adapted to limit current through the load.

26. The device of claim 24 further comprising a current sink in series with the load and adapted to sink current passing through the load to limit the charge energy received by the load.

27. The device of claim 24 wherein the load is a light source comprising one or more white LEDs (light emitting diodes).

28. The device of claim 27 wherein the one or more white LEDs are adapted for flash, movie or torch lighting operations.

29. The device of claim 24 wherein the charge energy includes burst power corresponding to a current pulse or continuous power corresponding to a current level.

30. The device of claim 29 wherein the current pulse is about 2 A and the current level is about 200 mA.

31. The device of claim 24 embodied in an IC (integrated circuit) or as a functional block in an IC.

32. The device of claim 31 wherein the IC is adapted for use in a mobile device.

33. The device of claim 32 wherein the mobile device includes a cell phone with a flash camera and/or a movie camera.

34. The device of claim 24 wherein the power source is a battery.

35. A device comprising:
a power source with a positive lead and a negative lead;
charge storage with a first capacitor component and a second capacitor component coupled in series, and a center tap between the first capacitor component and the second capacitor component;
a first charge path including a first positive switch and a first negative switch and disposed between the positive lead and the negative lead, the first charge path traversing the first capacitor component and the center tap but not traversing the second capacitor component, the first capacitor component and the center tap disposed between the first positive switch and the first negative switch, the first positive switch and the first negative switch being dedicated to the first charge path; and
a second charge path including a second positive switch and a second negative switch and disposed between the positive lead and the negative lead, the second charge path traversing the second capacitor component and the center tap but not traversing the first capacitor component, the second capacitor component and the center tap disposed between the second positive switch and the second negative switch, the second positive switch and the second negative switch being dedicated to the second charge path, each of the first and second charge paths having a switch control input adapted to provide open and closed switching control to allow charge current to pass from the power source to one or substantially simultaneously to both of the first and second capacitor components.

36. The device of claim 35 further comprising a control loop adapted to assert the switch control input of each of the first and second charge paths.

37. The device of claim 35 further comprising a voltage regulator operatively coupled to the switch control inputs.

38. The device of claim 35 further comprising a control loop including a control device adapted to sample the charge status and control the charge current based on a comparison between a reference and the charge current sample.

39. The device of claim 38 wherein the control device comprises a comparator or an amplifier.

40. The device of claim 38 wherein the reference input is one of voltage, current and time.

41. The device of claim 38 wherein the charge status is sampled as one or more of voltage, current and time.

42. The device of claim 38 wherein the control loop further includes a multiplexer that receives a sample measurement from the first and second charge paths, the multiplexer being adapted to pass one of the sample measurements to a charge sense input of a comparator based on a switch control input.

43. The device of claim 42 wherein the control loop includes the comparator and a wave source responsive to the comparator and adapted to assert the switch control input.

44. The device of claim 35 wherein the power source is a battery.

45. A device comprising:
a power source with a positive lead and a negative lead;
charge storage with a first capacitor component and a second capacitor component coupled in series, and a center tap between the first capacitor component and the second capacitor component;
a first charge path including a first positive switch and a first negative switch and disposed between the positive lead and the negative lead, the first charge path traversing the first capacitor component and the center tap but not traversing the second capacitor component, the first capacitor component and the center tap disposed between the first positive switch and the first negative switch, the first positive switch and the first negative switch being dedicated to the first charge path; and a second charge path including a second positive switch and a second negative switch and disposed between the positive lead and the negative lead, the second charge path traversing the second capacitor component and the center tap but not traversing the first capacitor component, the second capacitor component and the center tap disposed between the second positive switch and the second negative switch, the second positive switch and the second negative switch being dedicated to the second charge path, the first and second charge paths each having an input operatively coupled to a voltage regulator and adapted to provide charge current control.

46. The device of claim 45 wherein the first and second charge paths are controllable to allow charge current to flow therethrough from the power source to one or substantially simultaneously to both of the first and second capacitor components.

47. The device of claim 45 wherein the power source is a battery mounted externally to or integrated within the device.

48. A method comprising:
connecting to power source with a positive lead and a negative lead;
providing charge storage with a first capacitor component and a second capacitor component coupled in series, and a center tap between the first capacitor component and the second capacitor component;
providing a first charge path comprising a first positive switch and a first negative switch and disposed between the positive lead and the negative lead, the first charge path traversing the first capacitor component and the center tap but not traversing the second capacitor component, the first capacitor component and the center tap disposed between the first positive switch and the first negative switch, the first positive switch and the first negative switch being dedicated to the first charge path;
providing a second charge path comprising a second positive switch and a second negative switch and disposed between the positive lead and the negative lead, the second charge path traversing the second capacitor component and the center tap but not traversing the first capacitor component, the second capacitor component and the center tap disposed between the second positive switch and the second negative switch, the second positive switch and the second negative switch being dedicated to the second charge path; and
controlling each of the first and second charge paths to allow charge current to flow from the power source to one or substantially simultaneously to both the first and second capacitor components.

49. The method of claim 48 further comprising sensing the charge status in each of the first and second charge paths and controlling the charge current flowing through the first and second charge paths based on the charge status.

* * * * *

UNITED STATES PATENT AND TRADEMARK OFFICE
CERTIFICATE OF CORRECTION

| | | |
|---|---|---|
| PATENT NO. | : 8,493,036 B2 | Page 1 of 1 |
| APPLICATION NO. | : 11/559550 | |
| DATED | : July 23, 2013 | |
| INVENTOR(S) | : Ferrario | |

It is certified that error appears in the above-identified patent and that said Letters Patent is hereby corrected as shown below:

In the Claims:

Column 15, Claim 48, Line 24, before the word "power" insert --a--.

Signed and Sealed this
Seventh Day of January, 2014

Margaret A. Focarino
*Commissioner for Patents of the United States Patent and Trademark Office*